(12) United States Patent
Rudy et al.

(10) Patent No.: US 8,095,652 B2
(45) Date of Patent: Jan. 10, 2012

(54) ANALYSIS SYSTEM, INFORMATION PROCESSING APPARATUS, ACTIVITY ANALYSIS METHOD AND PROGRAM PRODUCT

(75) Inventors: Raymond Harry Putra Rudy, Yokohama (JP); Akiko Suzuki, Kawasaki (JP); Hiroki Yanagisawa, Yamato (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/395,031

(22) Filed: Feb. 27, 2009

(65) Prior Publication Data

US 2009/0222557 A1 Sep. 3, 2009

(30) Foreign Application Priority Data

Feb. 29, 2008 (JP) ................................. 2008-051431

(51) Int. Cl.
*G06F 15/173* (2006.01)
*G06F 15/16* (2006.01)
(52) U.S. Cl. ...................................... 709/224; 709/218

(58) Field of Classification Search .......... 709/201–204, 709/217–232
See application file for complete search history.

(56) References Cited

U.S. PATENT DOCUMENTS

| 2001/0042121 | A1* | 11/2001 | Defosse et al. ............... 709/224 |
| 2002/0010625 | A1* | 1/2002 | Smith et al. ..................... 705/14 |
| 2002/0055853 | A1* | 5/2002 | Macleod Beck et al. ......... 705/1 |
| 2006/0224938 | A1* | 10/2006 | Fikes et al. .................... 715/500 |

FOREIGN PATENT DOCUMENTS

| JP | 05233719 | 9/1993 |
| JP | 2006259801 | 9/2006 |
| JP | 2007264718 | 10/2007 |

* cited by examiner

*Primary Examiner* — Yasin Barqadle
(74) *Attorney, Agent, or Firm* — Vazken Alexanian

(57) ABSTRACT

An analysis system, information processing apparatus, activity analysis method, and program for analyzing activities of an information source on a network. The system and apparatus include an attribute extraction block for extracting, an information propagation graph acquisition block for searching action history data, and a characteristic user calculation block for calculating an amount characteristic. The method and program product include the steps of extracting an information characteristic value, searching action history data, registering the information, calculating an amount characteristic, and integrating the amount characteristic.

17 Claims, 17 Drawing Sheets

| CONTENT ID | TIMESTAMP | CONTENT DATA |
|---|---|---|
| 100 | 2008/2/10 | This is a story I traveled abroad. The airplane was a little behind schedule... |
| 200 | 2008/2/12 | I went to a famous Takoyaki (Octopus ball) shop and found a long line of people stood in front of the shop... |
| 300 | 2008/2/14 | When I went to Europe on a foreign trip... |
| 400 | 2008/2/16 | I was tired so I spent all day not working hard... |

| USER ID | ACTION TYPE | CONTENT ID | TIMESTAMP |
|---|---|---|---|
| A | write | 100 | 2008/2/10 |
| B | read | 100 | 2008/2/11 |
| C | read | 100 | 2008/2/11 |
| B | write | 200 | 2008/2/12 |
| C | read | 200 | 2008/2/13 |
| A | read | 200 | 2008/2/14 |
| C | write | 300 | 2008/2/14 |
| A | read | 300 | 2008/2/16 |
| A | write | 400 | 2008/2/16 |

302 / 304 / 306 / 308

600

610 620

| CONTENT ID | KEYWORD LIST |
|---|---|
| 100 | FOREIGN TRAVEL, CHINESE GREAT WALL,... |
| 200 | IN FRONT OF STATION, OCTOPUS BALL, LONG LINE OF PEOPLE,... |
| 300 | FOREIGN TRAVEL, AIRPLANE, RESERVATION,... |
| 400 | NEWS, CHINESE GREAT WALL,... |

FIG. 6

| 1010 | 1020 | 1030 | 1040 |
|---|---|---|---|
| NODE ID | NODE ATTRIBUTE | DEPARTURE LINK | INCOMING LINK |
| ID_1 | CONTENT ID:<br>GENERATED TIMESTAMP:<br>USER ID:<br>NUMBER OF READS: etc. | RINK ID_L:<br>RINK ID_O | — |
| ID_2 | CONTENT ID:<br>GENERATED TIMESTAMP:<br>USER ID:<br>NUMBER OF READS: etc. | RINK ID_N:<br>RINK ID_M | RINK ID_L |
| ID_3 | CONTENT ID:<br>GENERATED TIMESTAMP:<br>USER ID:<br>NUMBER OF READS: etc. | RINK ID_P | RINK ID_O:<br>RINK ID_N |
| ID_4 | CONTENT ID:<br>GENERATED TIMESTAMP:<br>USER ID:<br>NUMBER OF READS: etc. | — | RINK ID_M:<br>RINK ID_P |
| ... | ... | ... | ... |

1000

| 1060 | 1070 |
|---|---|
| LINK ID | NODE ATTRIBUTE |
| RINK ID_L | — |
| RINK ID_M | LINK SOURCE CONTENT ID:<br>LINK DESTINATION CONTENT ID:<br>LINK SOURCE ACCESS TIMESTAMP:<br>etc. |
| ... | ... |

ANALYSIS SYSTEM, INFORMATION PROCESSING APPARATUS, ACTIVITY ANALYSIS METHOD AND PROGRAM PRODUCT

CROSS REFERENCE TO RELATED APPLICATION

This application claims priority under 35 U.S.C. §119 from Japanese Patent Application No. 200851431 filed Feb. 29, 2008, the entire contents of which are incorporated by reference herein.

BACKGROUND OF THE INVENTION

1. Field of the Invention

The present invention relates to a technique for characterization of a user using a network. More particularly, the present invention relates to an analysis system, an information processing apparatus, an activity analysis method and a program for analyzing the user using the characteristics of network nodes to propagate information.

2. Description of the Related Art

Recently, as computers and communication devices have improved their processing power, information communication has been performed through a network such as the Internet or WAN (Wide Area Network). The network is configured by including client computers (hereinafter simply called "client") and a server computer (hereinafter simply called "server"). The clients and server configure network nodes.

A client is operated by a user identified by a user ID uniquely identifying the user. The user sends various requests to the server through the network and receives processing results from the server. Then, the user registers, in the server, information including various contents such as text, image, moving image data, audio data, and multimedia data, or takes actions including various processing such as search, buying a product, posting, chat, and update of a blog (Weblog) through an SNS (Social Network Service) provided by the server.

If the server provides an SNS function to the user, the user sends/receives information through actions such as to write a diary in a blog and read another person's blog through the client. Hereinafter, "information sending" means uploading of information to the server and "information receiving" means acquisition of information from the server.

In general, the activities of users to a network vary depending on the users' preferences, aims and access modes for the network. For example, a specific client uploads a diary to a blog system almost every day. Another client engages in an activity to post a comment for the information already registered, rather than uploading diaries. Still another client engages in an activity to search information exclusively in order to download information.

Systems for detecting information propagation through a network are known. For example, Japanese Patent Application No. 2006259801 ("Patent Document 1") discloses an information utilization analysis/display device for managing information propagated through an "informal" network element, in which no client has been previously defined and therefore every client can participate, such as an organization allowing clients to voluntarily participate in a community, a bulletin board system, and a mailing list.

The information utilization analysis/display device disclosed in Patent Document 1 detects information propagated in a network element allowing a client to voluntarily participate in and the status of the information utilization propagated outside of the network element to display the utilization status of the information by means of configuration network elements, making an informal network element available as a business resource.

In Patent Document 1, an information utilization by a configuration element using information propagation through a network element is acquired to acquire information about users and the like included in an informal network configuration element. Thus, if the information propagation between users is analyzed, an information propagation route can be traced. However, it is not enough to generate only a directed graph using information propagation in order to analyze what role a user plays on the network using the information propagation on the network, that is, the activity of the user on the network.

Further, analysis of the activities of the user on the network reflects a difference from information that the user desire to acquire through the network. In this respect, Patent Document 1 enables acquisition of an information propagation route, but it does not detect for what purpose the client configures the information propagation route.

Japanese Patent Application No. 2007264718 ("Patent Document 2") discloses a technique for estimating interest of a user in real time from words propagated between files circulated by the user. In Patent Document 2, the user acquires a plurality of words included in a file from the history of the file circulated by the user to determine an IDF value indicating the frequency of occurrence of the word propagated in the file in order to estimate the changing interest of the user in real time.

The changing interest of the user disclosed in Patent Document 2 is applied to the case when the user browses a specific content, and it does not characterize the activity of the user through the network.

Further, Japanese Patent Application No. 5233719 ("Patent Document 3") discloses a technique for calculating relevance between pieces of information using a characteristic representing sentence and time data of information generation to associate between them. The technique disclosed in Patent Document 3 does not aim to characterize the activity of the user on the network. Thus, the propagation route and the activity of the user on the propagation route are detected to characterize the user. If the characterization is reflected in information distribution from an information processing device such as a server through the network, it can be expected that more efficient information distribution can be performed for the user accessing the network.

Thus, a technique which detects the purpose of a user connected to a network through a client propagates information, registers it, and reflects the activity of the user on the network in server's processing is desirable.

Further, a technique for detecting the activities of the user on the network is also needed to enable characterization of the user.

SUMMARY OF THE INVENTION

The present invention provides an analysis system, an information processing apparatus, an activity analysis method, and program product for analyzing activity of an information source on a network.

According to an aspect of the present invention, an analysis system is provided. The system includes an attribute extraction block for extracting an information characteristic value, an information propagation graph acquisition block for searching action history data, and a characteristic user calculation block for calculating an amount characteristic.

According to a further aspect of the present invention, an information processing apparatus is provided. The apparatus includes an attribute extraction block for extracting an information characteristic value, an information propagation graph acquisition block for searching action history data, and a characteristic user calculation block for calculating an amount characteristic.

According to still a further aspect of the present invention, an activity analysis method and a program product are provided. The method and program product include the steps of extracting an information characteristic value from information transmitted through the network, searching action history data, registering the information, calculating an amount of characteristic, and integrating the amount of characteristic.

BRIEF DESCRIPTION OF THE DRAWINGS

FIG. 3 shows an example of action log data stored in action log storage 230 and contents stored in a content storage 232.

FIG. 6 shows an example of an index list 600 generated by the preprocessing described in FIG. 5.

FIG. 10 is a schematic diagram of a data structure for defining an information propagation graph 910 in information processing.

DETAILED DESCRIPTION OF THE PREFERRED EMBODIMENTS

Section 1: Hardware Basis

The following describes the present invention using a preferred embodiment, but the present invention is not limited to the embodiment described below.

Figure 1:
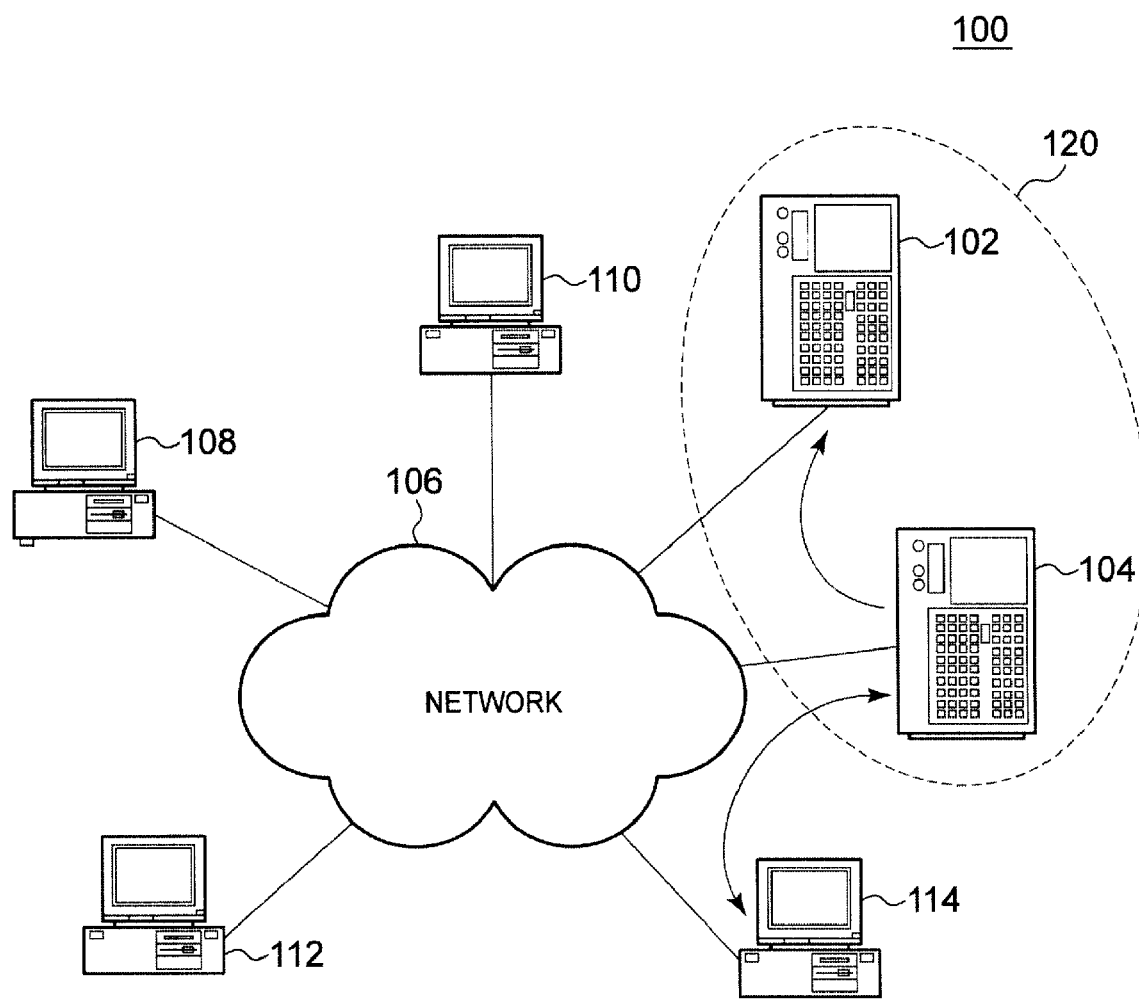
FIG. 1 is a schematic diagram showing an example of an analysis system 100 according to a preferred embodiment.

FIG. 1 shows an example of an analysis system 100 according to the embodiment. The analysis system 100 is configured by including a network 106 and a plurality of clients 108, 112 and 114 operated by users to access a server 104 through a network 106.

Further, an analysis server 102 is connected to the network 106 to characterize each user using action logs including content and browser logs accumulated on the server 104. The server 104 can be, for example, a web server, an SNS server, or a mail server though the present invention is not limited thereto. In the embodiment, it is preferable that the network 106 includes the Internet, but it can include a WAN (Wide Area Network) or LAN (Local Area Network) other than the Internet.

Further, as shown in FIG. 1, the analysis server 102 can be configured as a web server separately from the server 104. Further, according to another example, the functions of the analysis server 102 and the server 104 can be combined to implement them as a single server or a rack mount-type function integrating server 120. In this example, the analysis server 102 and the server 104 can be implemented as separate function modules of the server 120, or separate thin servers or appliance servers. Note that the detailed configuration of the function modules and hardware of the analysis server 102 and the server 104 can be set as appropriate according to the specific intended use or purpose.

The above-mentioned analysis server 102 and the server 104 are implemented as an information processing apparatus, and a CISC architecture microprocessor (MPU), such as Pentium™ or Pentium™ compatible chip, or a RISC architecture microprocessor such as Power PCT™ can be mounted. Each of the servers 102 and 104 is controlled by an operating system such as WINDOWS™ 200X, UNIX™, or LINUX™. Further, the analysis server 102 and the server 104 are implemented using a programming language such as C++, JAVA™, JAVA™ BEANS, PERL, RUBY to execute a server program such as CGI, servlet, APACHE in order to process requests from the clients 108, 112 and 114.

The clients 108, 112, and 114 are connected to the server 104 through a network using a transaction using a file transfer protocol such as HTTP protocol based on a transaction protocol such as TCP/IP. The clients 108, 112 and 114 access the server 104 to perform file upload, file download, blog writing, blog reading, description of thoughts, chat, form sending, form download, content upload, content download. Hereinafter, a file operation performed to the server 104 by a user using his or her client through a network is referred to as an action type. Further, the tendency of a user to be an information source transmitting information to the network 106 is referred to as a user activity.

Note that the term "information" means data structure created in a computer accessible format, such as text, image, moving image data, audio data, multimedia data to be referred to as contents in a specific embodiment.

The clients 108, 112 and 114 can be a personal computer or a workstation, and their microprocessors can include any existing single core processor or dual core processor. The clients 108, 112 and 114 are controlled by any operating system such as Windows™, UNIX™, LINUX™, or MAC OS. Further, the clients 108, 112, and 114 use browser software, such as Internet Explorer™, Mozilla, Opera, Netscape Navigator™, to access the server 104 in order to perform processing such as information acquisition and information generation.

The clients 108, 112 and 114, an administrator terminal 110 to be described later, and the servers are each configured by including a RAM, a hard disk drive, a CD-RW, a DVD-RW, and a USB port to secure an execution space for a program in order to enable data writing and reading.

Further, a management terminal 110 for setting the analysis server 102 is connected to network 106. The management terminal 110 can be generally configured as well as the above-mentioned clients 108, 112 and 114. The administrator terminal 110 accesses, for example, a web page for setting conditions using a password and a login name for the administrator and sends the set conditions in a format such as a form to specify content attributes associated with a user to be characterized, and the analysis server 102 acquires the configuration. Upon starting a server program for performing analysis processing, the analysis server 102 uses the acquired setting conditions to analyze activities of each user associated with the content attributes in order to characterize the user in association with the activities.

Each content attribute is specified by a content characteristic value. Although the content characteristic value can be decided by using various conditions in configuration, but in the embodiment, the content characteristic value is decided by using a keyword included in the content regardless of the content type. The keyword can be acquired from text or audio data included in the content. The title of the content, meta data, or abstract can be used as an area of interest for providing the content attribute.

If the content is multimedia data including sound (voice), the audio data of the content characteristic value can be converted to text data using an audio converting program to use it for acquiring the content attribute. Alternatively, a specific file type can be specified, for example, an extension can be specified, or specific control data described in the content header can be specified.

In FIG. 1, it is assumed that the administrator terminal 110 provides condition settings to the analysis server 102 through the network 106. However, in another example, the administrator terminal 110 can configure the analysis server 102 as a terminal connected by a local area network (LAN). In still another example, a display device, a keyboard and a mouse connected to the analysis server 102 through VGA, XGA cable, or USB can be used to provide condition settings directly without providing the administrator terminal 110.

In the embodiment described with reference to FIG. 1, the analysis server 102 acquires, from the server 104, the content itself specified by condition settings, or the content identification value (hereinafter called "content ID") at appropriate timing after the conditions for deciding the content attribute are set. Then, action log data is acquired from the server 104 to characterize the user using action history data associated with the acquired content attribute. In the embodiment, action history data is referred to as action log data indicating action logs of the user to the server 104 through the network 106, the data need not be managed as the log data as long as it is in an appropriate format for the following processing.

Figure 2:
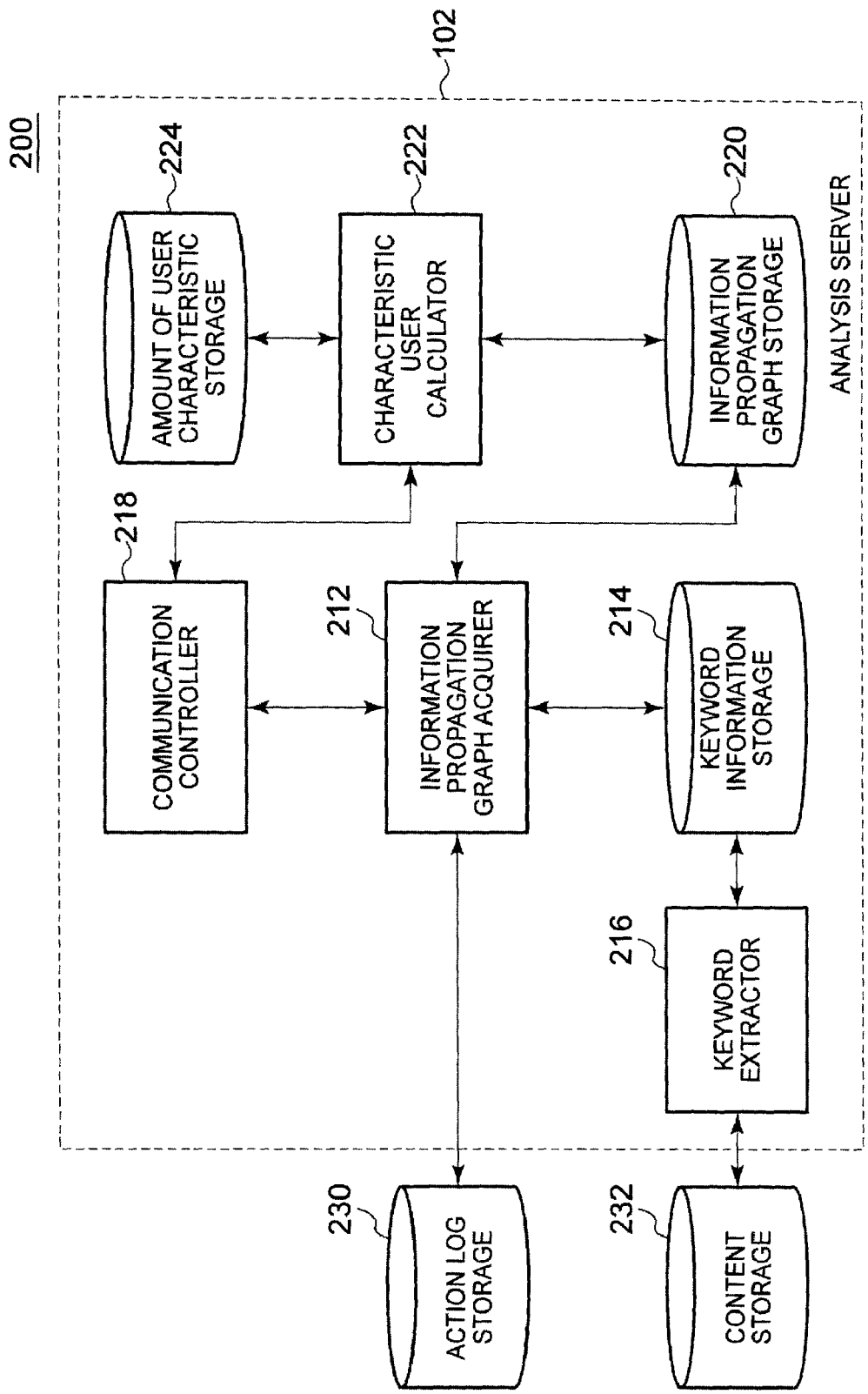
FIG. 2 is a functional block diagram of an analysis server 102 shown in FIG. 1.

FIG. 2 is a functional block diagram 200 of the analysis server 102 shown in FIG. 1. In the analysis server 102, the program and hardware cooperate to provide each function means as a plurality of functional blocks. The analysis server 102 includes a communication controller 218, an information propagation graph acquirer 212, a keyword information storage 214, and a keyword extractor 216. The communication controller 218 is configured as a network adapter using an NIC (Network Interface Card) and software. If the analysis server 102 has a display device, a keyboard, and the like, the communication controller 218 can be mounted as a USB host interface.

The communication controller 218 receives condition settings from the administrator terminal 110 through the network 106 to cause the information propagation graph acquirer 212 to generate an information propagation graph between clients in association with the content attributes. In the embodiment, it is assumed that a keyword is used as the set condition, but the present invention is not particularly limited thereto. The following refers to, as attribute specifying keywords, a keyword (set) functioning as the set condition.

The keyword extractor 216 functions as an attribute extractor of the embodiment, extracts keywords functioning as information characteristic values of the content stored in a content storage 232 functioning as an information storage so that an index list is created and stored in such a manner to associate the keywords included in the content with the content ID. In the embodiment, the keyword information storage 214 stores the attribute specifying keywords acquired as the set condition.

In the embodiment, the keyword information storage 214 functions as a set condition information storage. The keyword information storage 214 searches the index list managed by the keyword extractor 216 using an attribute specifying keyword W to generate a content set to be a target for user analysis as a set of content IDs that matches the search condition. The generated content set is sent to an appropriate storage area of the analysis server 214 and provided for processing performed by the information propagation graph acquirer 212. An action log storage 230 is data itself as browser logs of the server 104, or it is configured within a storage device for accumulating access logs to the server 104.

The information propagation graph acquirer 212 acquires data stored in the action log storage 230 and traces information propagation from a specific client to the server, or between arbitrary two clients, to characterize a user associated with a specific client. The information propagation graph created by the information propagation graph acquirer 212 is stored in an information propagation graph storage 220 configured in an appropriate storage area such as a hard disk drive or RAM. The action log storage 230 and the content storage 232 can be mounted in the separated server 104, or if they are configured in the same server 120, they can be stored as global data in an appropriate area in a hard disk drive of the server 120.

On the other hand, the communication controller 218 sends the received condition settings to a characteristic user calculator 222 so that the condition settings are used to characterize the user in the characteristic user calculator 222. To be more specific, the characteristic user calculator 222 includes a node characterizing calculator and a user characterizing calculator. The amount of user characteristic is calculated as a numerical value, which is derived from the amount of node characteristic using chronological relevance of a directed link assigned between nodes. The generated amount of user characteristic is stored in an amount of user characteristic storage 224.

In the embodiment, the term "node" means a data structure extracted from the content stored in the server 104. The node has specific content attributes, and when the generation or editing of the action type is completed, the node is described by other data to characterize the node according to the particular purpose, such as the content ID identifying the content, the timestamp upon completion of generation or editing, the user ID, and the number of reads. The processing performed by the node characterizing calculator and the user characterizing calculator will be described in detail later.

The information propagation graph is read from the information propagation graph storage 220 to acquire a node associated with the information propagation. The characteristic user calculator 222 calculates the amount of characteristic for each user from the directed graph using the acquired data to characterize a user from a standpoint of activity for the network 106 based on the amount of characteristic associated with the content attribute. The results are registered in an amount of user characteristic storage 224 and stored as a result of the user analysis.

After that, the amount of user characteristic is created in the server 104 as a table including user ID, content attributes, and the amount of characteristic. This table is used for the server 104 to display a banner advertisement or check the effect of the banner advertisement. It can also be used to trace a user functioning as a content information source having specific content attributes. If the server 104 uses the amount of user characteristic, the server 104 of the embodiment can provide the banner advertisement efficiently using the amount of user characteristic associated with the content attributes of the user before the user enters a keyword.

Further, in another embodiment, the server 104 or the analysis server 102 identifies a user frequently transmitting information associated with a specific content or a user frequently receiving information. This can provide information for information propagation analysis using activities of the user on the network 106.

Section 2: User Activity Network

FIG. 3 shows examples of action log data stored in the action log storage 230 and the content stored in the content storage 232. Action log data 300 records how a user uniquely identified by a user ID acts on the specific content through the network 106. As shown in FIG. 3A, the action log data 300 includes: a field 302 in which each user ID is registered, a field 304 in which an action of each user identified by each user ID and taken through the network 106 is registered, a field 306 in which a content ID of each content targeted by each user's action is registered, and a field 308 in which the date and time of completion of each user's action is registered. Note that only the date is shown in the field 308 of FIG. 3A for sake of simplicity.

The following further describes the action log data 300. For example, a user specified by user ID=A wrote content specified by content ID=100 and finished the writing at timestamp=2008/2/10 21:10:36 (Feb. 10, 2008, 21:10:36). Further, another user specified by user ID=B read the content ID=100 and finished reading transaction at timestamp=2008/2/11, 10:38:15.

After that, the action log data 300 is recorded in the same manner that a user with user ID=C read the content ID=100, a user with user ID=B wrote the content ID=200, and a user with user ID=C read the content ID=200. Thus, use of the action log data 300 can trace activities of a specific user identified by user ID for the content through the network 106.

Further, as shown in FIG. 3B, a content list 350 includes a field 352 in which each content ID for uniquely identifying the content is registered, a field 354 in which each timestamp corresponding to the date and time of completion of the content creation is registered, and a field 356 in which each content is registered. Once a content is created, a content ID unique to the created content is assigned, and then a timestamp is assigned. After completion of these assignments, an information processing apparatus such as the server 104 for managing action log data registers, in the action log data 300, a user ID and an action type as an activity, and a content ID and a timestamp are registered in the field 306 and the field 308, respectively. Thus, each data structure shown in FIG. 3 is accumulated each time each user accesses the server 104.

Figure 4:
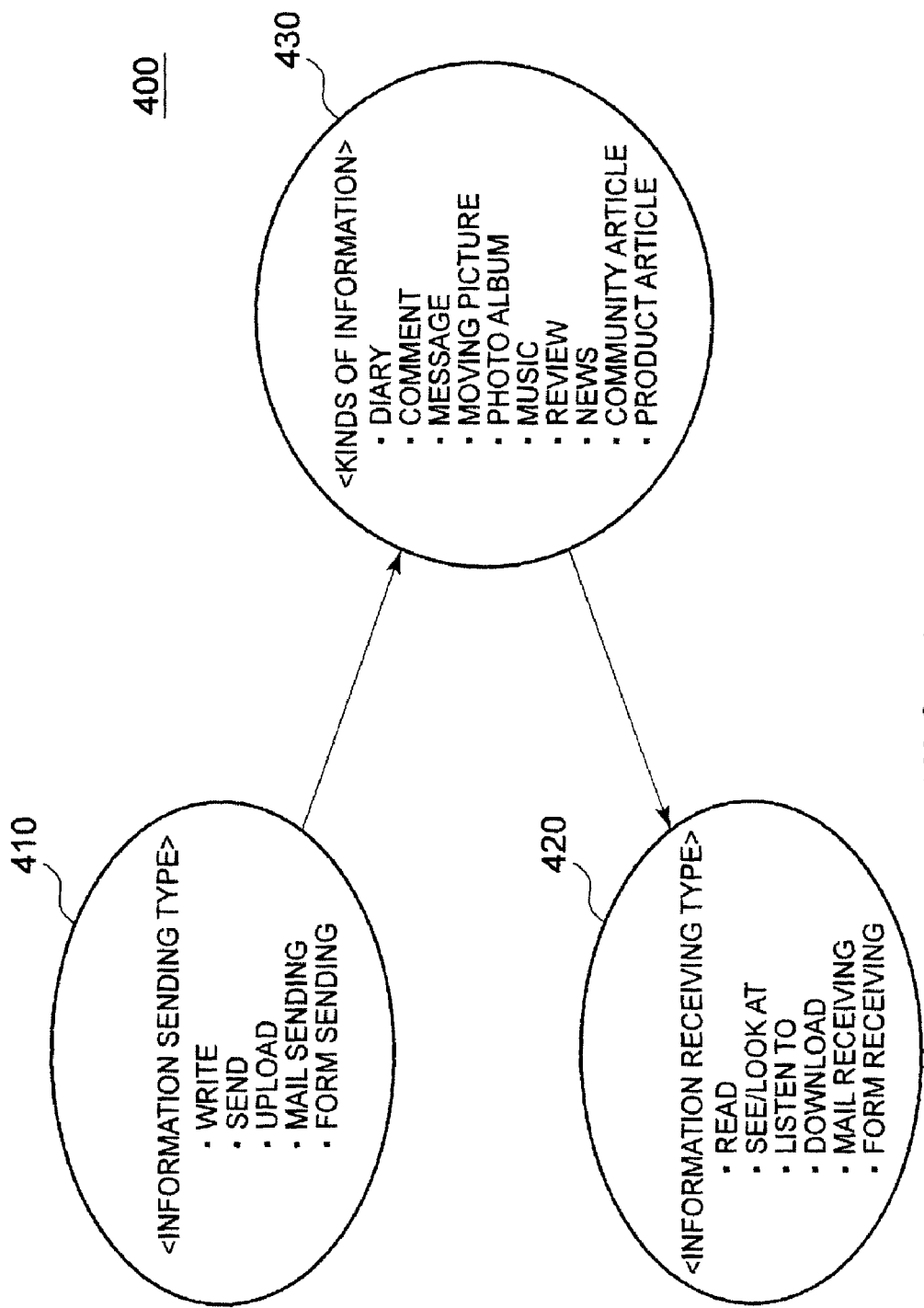
FIG. 4 is a schematic diagram of action type 400 of the user in the embodiment.

FIG. 4 is a schematic diagram showing action types 400 of users in the embodiment. The action types 400 of users are roughly classified into an information sending type 410 and an information receiving type 420. The information sending type 410 includes, as action contents, "Write," "Send," "Upload," "Mail Sending," "Form Sending," for example.

Further, the information receiving type 420 includes, as action contents, "Read," "See/Look at," "Listen to," "Download," "Mail Receiving," "Form Receiving," for example. Note that these action types are just illustrative examples, any other action contents can be registered in the action log data 300 as action types.

Further, information kind 430 targeted for user's actions includes all information capable of being dealt with by the server 104. Typical examples of such information kinds include diary (blog), comment, message, moving image, photo album, music, review, news, community article and production article. Note also that these information kinds are just illustrative examples, and the present invention is not limited to the information kind 430.

Thus, use of the action log data 300 enables tracing as to what action type a user identified by a corresponding user ID acts on the content. However, only the action log data 300 is not enough to determine an action pattern when the user identified by the user ID accesses the network 106. The following discusses a case where the user accesses the network 106. When the user accesses the network 106 to engage in activities, it is considered that writing and uploading are frequently performed for a specific content.

Further, it can be assumed that even the same user takes no action on the content that does not have a specific content, or takes an action only for information receiving type as the action type. In other words, the information propagation route can be traced based on the processing performed by the server 104 using action logs even by the conventional technique. However, the user cannot be associated with the content attribute to characterize the user by means of an activity on the information propagation associated with the user's preference on the network.

The analysis server 102 of the embodiment characterizes an activity of the user on the network 106 associated with the content attribute. The analysis server 102 reads the action log data 300 from the action log storage 230, and acquires the content stored in the content storage 232 in order to index the content with a keyword included in the content. The analysis server 102 of the embodiment uses indexing with the keyword and the action log data to characterize the activity of the user associated with the content attribute. The following describes in detail an activity analysis method performed by the analysis server 102.

Section 3: User Characterizing Processing 3-1. Preprocessing

Figure 5:
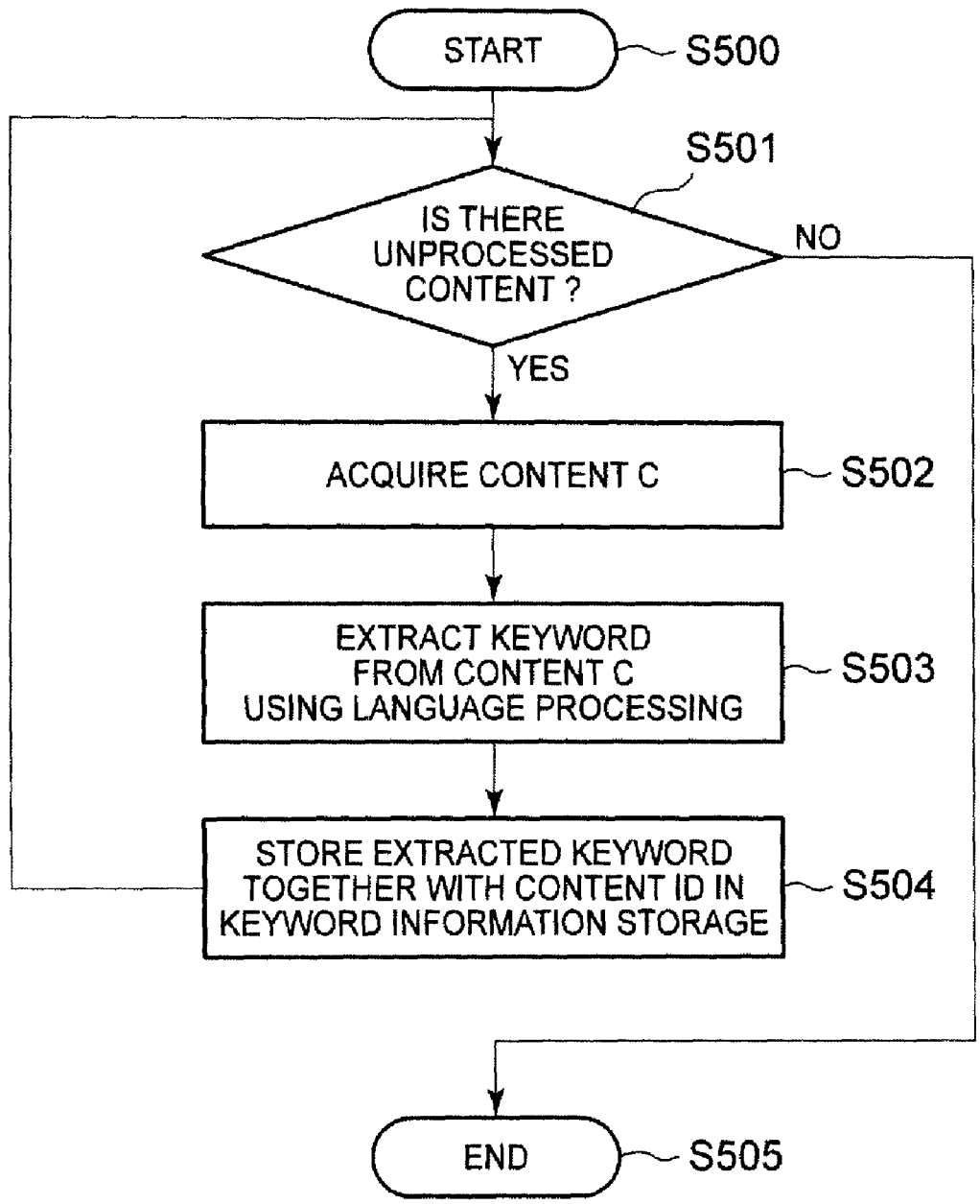
FIG. 5 is a flowchart of keyword extraction corresponding to preprocessing for user characterizing processing executed by the analysis server 102 and content indexing processing with a keyword.

FIG. 5 is a flowchart for keyword extraction corresponding to preprocessing and content indexing processing with keywords for user characterizing processing performed by the analysis server 102. The processing of FIG. 5 starts at step S500. Then, it is determined in step S501 whether there is a content, in the content storage 232, whose keywords have not been extracted. In the processing of step S501, the analysis server 102 searches the content storage 232 periodically so that only contents added after the last extraction are processed. Further, the determination of whether a content has been processed or not can be made by setting a flag to index the processed content. Further, in a more preferable embodiment, the content ID held by the analysis server 102 is compared with the content ID stored in the content storage 232, and those with timestamp latter than that in the analysis server are added as targets to be processed. In this case, the ID of the content processed from a queue corresponding to the processed content can be deleted to determine unprocessed/processed contents.

If an unprocessed content remains (Yes), an unprocessed content C is acquired in step S502 to extract keywords from the content C in step S503. The keyword extraction can be done by any known method. For example, a morphological analysis technique can be employed. Further, in the embodiment, in order to improve the quality of extracted keywords, TF (Term Frequency) method, IDF (Inverted Document Frequency) method, or TF-IDF method obtained by multiplying both values can be employed as methods of selecting keywords that highly characterize the content from extracted keyword group.

Further, in another embodiment, a keyword extraction method referred as user's action matrix as disclosed in (Japanese patent application No. 2007-336919) can also be employed. The action matrix is a matrix configured by user actions and keywords extracted from a text used together with each action whose element is a value generated based on the frequency of appearance of each keyword accumulated until a certain time. Schematically, the action matrix is an accumulated form of keywords $W=\{w_1, w_2, w_3, \ldots\}$ associated with action a, that are extracted from the text d that is involved with the action a of the user.

If keyword $w_i$ appears once in the text d associated with an action $a_j$, one (or a value multiplied by a weight) is entered in i row and j column of the action matrix. Further, action matrix at certain time $T_{i+1}$ is generated by weighing, mixing and updating with, at next time $T_{i+1}$, the action matrix (called the temporary action matrix) during $\Delta T=T_{i+1}-T_i$. Thus, because a characteristic keyword is generated as a singular value of the action matrix, the characteristic keyword can be extracted from extensive keywords.

In step S504, the extracted keyword is registered in association with the content ID, an index list is generated, and the processing branches to step S501 again. Step S502 to step S504 are repeated until no unprocessed content appears in the processing in step S501. If there is no unprocessed content (No) in step S501, the processing branches to step S505 to end the processing.

The processing described with reference to FIG. 5 can be performed using a dedicated module. However, if the analysis server 102 can be combined with a keyword extraction module created for a search engine, it does not need to be mounted as the dedicated function module of the analysis server 102.

FIG. 6 shows an example of the index list 600 generated in the preprocessing described with reference to FIG. 5. The index list 600 shown in FIG. 6 is formed of a field 610 registering content IDs and a field 620 registering an extracted keyword list, so that a content ID can correspond to keywords included in the content specified by the content ID. The analysis server 102 uses an attribute keyword on the administrator terminal 110 for the index list shown in FIG. 6 to extract a content having the specified attribute keyword in order to decide user's activity in association with the extracted content.

The keywords can be generated from any part of the content, such as the text of the content, the abstract of the content, the title of the content, and other meta data. If the content is a multimedia content or audio data, keywords can be retrieved from a data part convertible to text by using, for example, speech-to-text conversion software (for example, VIA-VOICE™).

3-2. Generation of Content Set as Analysis Target

Figure 7:
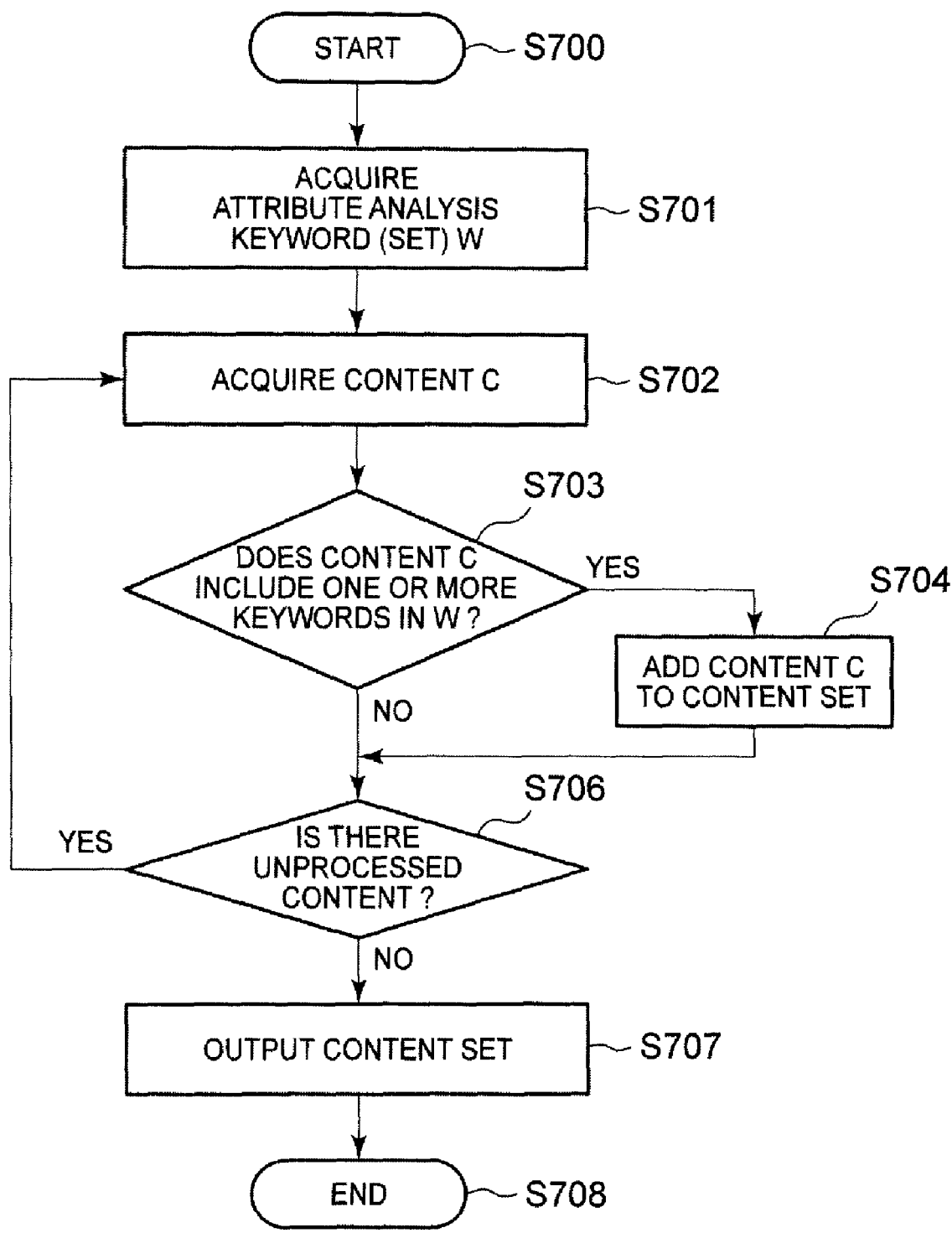
FIG. 7 is a flowchart of an example of processing for searching a content having a specified attribute using an attribute specifying keyword.

FIG. 7 is a flowchart of an embodiment of processing for searching a content having a specified attribute by using the attribute specifying keyword. The processing of FIG. 7 starts at step S700 and the attribute specifying keyword is acquired in step S701. The attribute specifying keyword is a keyword, or generally a set of keywords, capable of characterizing a user of the analysis server 102 or a user whom a client wants to analyze. The attribute specifying keyword can be acquired each time from the communication controller 218 through the network 106.

Alternatively, the attribute specifying keyword can be pre-registered in the analysis server 102 so that it is read and acquired from the memory, the hard disk drive, or a similar device upon start of the processing in FIG. 7.

In step S702, content C as a search target is specified from the index list 600 and in step S703, it is determined whether the content C includes at least one keyword from the keyword set W. This determination is made by specifying a content ID in the index list 600 and searching each individual keyword included in the attribute specifying keyword. If there are multiple keywords, a logical relationship between keywords by combining any of OR, AND, and NOT, for example, can be used to generate a search expression.

Note that searching in step S703 is executed by implementing a dedicated program for keyword searching using a database software or object-oriented programming such as JAVA™. When there are multiple keywords upon searching in step S703 and OR combines those keywords, if the content C includes at least one attribute specifying keyword in step S703 (Yes), the content C is added to the content set in step S704, and the processing branches to step S706.

On the other hand, if the content C does not include the attribute specifying keyword in step S703 (No), it is determined in step S706 whether any unprocessed content remains or not. If there is an unprocessed content (Yes), the processing branches to step S702 to further perform the content extraction with the attribute specifying keyword. On the other hand, if there is no unprocessed content (No) in step S706, because it means that the extraction of all the contents registered in the index list 600 is ended, the content set is decided in step S707 and is stored in the memory or hard disk drive for subsequent processing.

Figure 8:
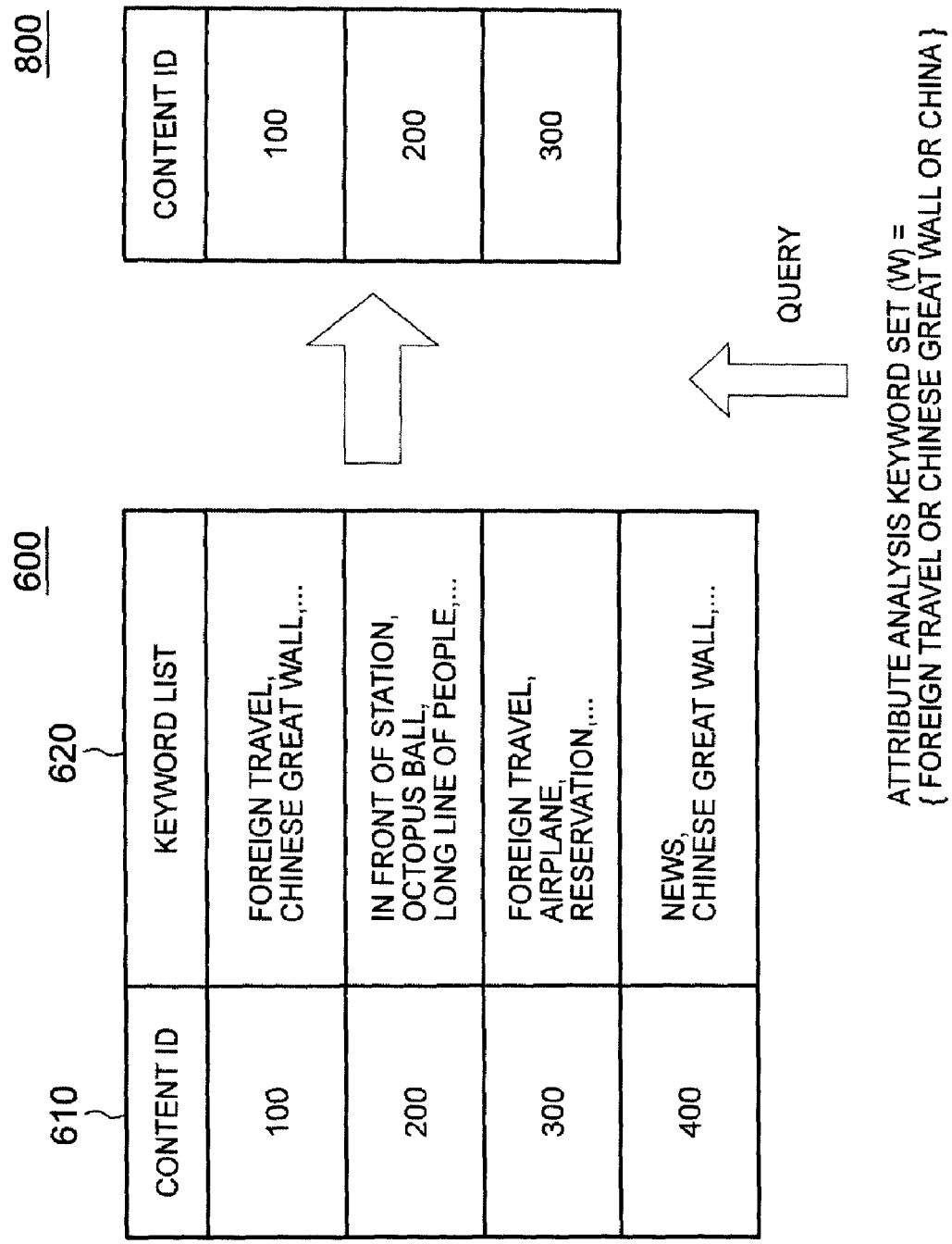
FIG. 8 is a schematic diagram showing content extraction processing in step S703 and step S704 of FIG. 7 using a data structure created.

FIG. 8 is a schematic diagram for explaining the content extraction processing in step S703 and step S704 of FIG. 7 using a created data structure. As shown in FIG. 8, the analysis server 102 specifies a content ID from the field 610 of the index list 600 to query the existence of keywords in the keyword list registered as the field 620 and corresponding to the content ID using the set W of the attribute specifying keywords. In the embodiment as shown in FIG. 8, the attribute specifying keyword set=W includes three keywords: foreign travel, Chinese Great Wall, and China.

The analysis server 102 searches the index list 600 to extract content IDs including keywords included in the attribute specifying keyword W, and registers them in the table in due order. In FIG. 8, because content ID=100 includes keyword=foreign travel, content ID=300 includes keyword=foreign travel, and content ID=400 includes keyword=Chinese Great Wall, those content IDs are extracted into the table to generate a content set 800.

3-3. Information Propagation Graph: Data Structure

Figure 9:
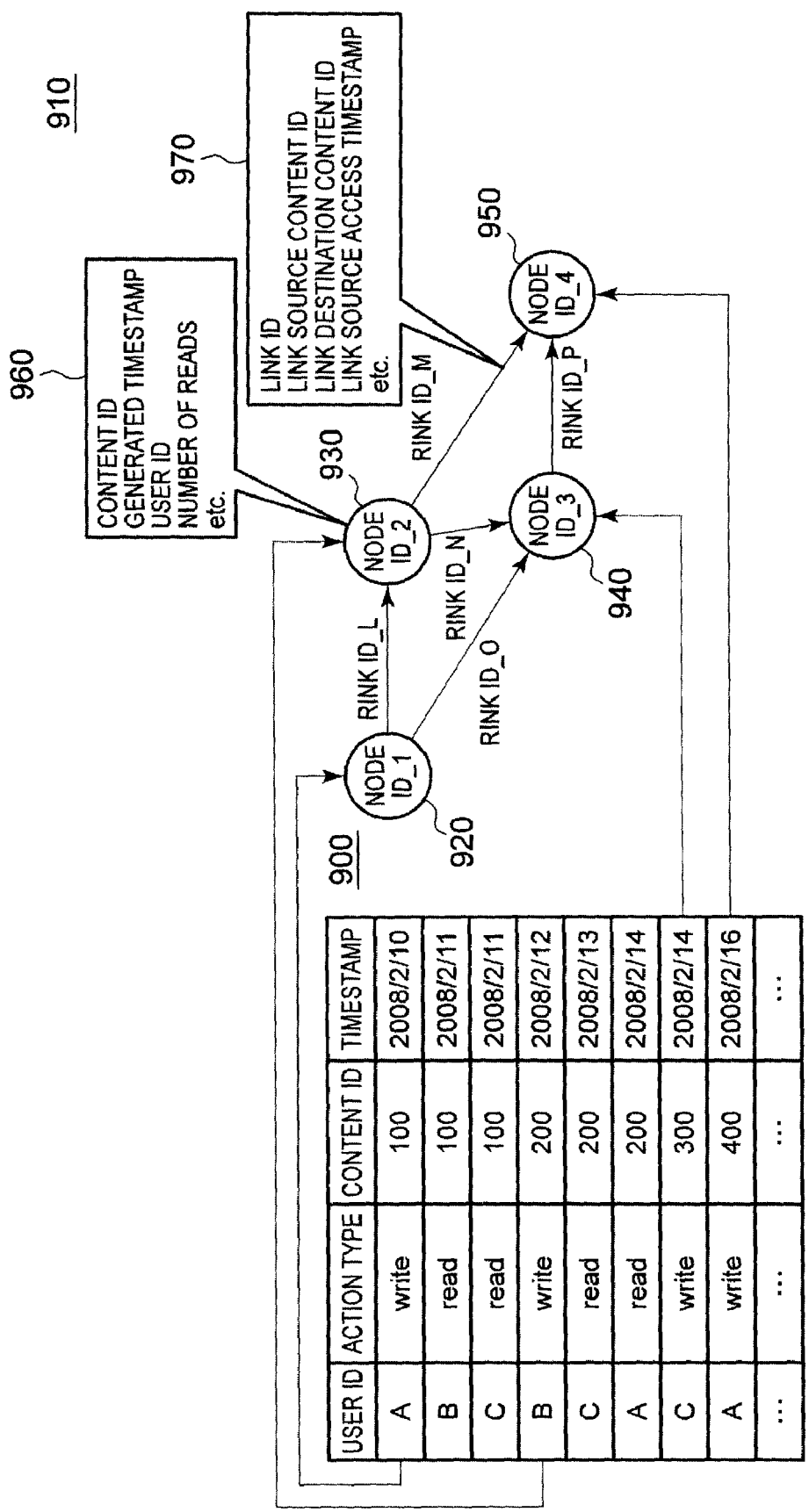
FIG. 9 is a schematic diagram showing processing for causing the analysis server 102 to generate an information propagation relationship between contents from action log data 900.

FIG. 9 is a schematic diagram of processing performed by the analysis server 102 to generate an information propagation relationship between contents from an action log data 900. For convenience sake, it is assumed that the action log data 900 shown in FIG. 9 is the action log data configured as a data structure generated by searching the action log data 300 associated with the content set generated by the processing as described in FIG. 8. Note that, in another embodiment, the action log data 900 can be searched on-the-fly so that the information propagation graph acquirer is informed in due order each time the search query is hit.

The analysis server 102 registers the contents stored in the action log data 900 as an information propagation graph 910 in order to show the information propagation relationship. The information propagation graph 910 is created as a directed graph, and nodes in the information propagation graph 910 are registered in response to completion of the creation or edition of content after the user creates the content through the network 106.

This determination is made by referring to a content ID, an action type, and a timestamp of the action log data 900, corresponding to a user ID. In other words, processing for registering a content as a node of the information propagation graph 910 is performed by referring to action type=write (or other action types that correspond to adding contents to the server 104, such as blog writing, impression writing, file uploading) and a content ID whose timestamp has been registered.

To be more specific, the information propagation graph 910 is generated as follows: A content ID with action type=write is acquired from the action log data 900 shown in FIG. 9. In the embodiment, a content ID whose timestamp is the oldest is registered as a node of the specified information propagation graph 910. Then, content IDs with action type=write are extracted and registered as nodes in timestamp chronological order. A node ID as a node identification value for uniquely identifying the node is registered at the node.

Further, a node attribute 960 is registered at a node, for example node ID_2, to characterize the node in the information propagation graph 910. In the illustrated embodiment, the node attribute 960 can be registered for subsequent characterizing processing with any parameters that can fit in for a specific purpose of characterizing the user, such as content ID, timestamp, user ID of the user who generates the content, the number of times of the node being read, etc.

Further, a directed link for connecting nodes is provided between different nodes to define a time-series relationship between different nodes 920, 930, 940 and 950. As shown in FIG. 9, the directed links include an outgoing link and an incoming link. The outgoing link, for example, link ID_L, is referred to as a link generated from a node whose timestamp is older in order from older to newer as seen from the older node, that is, node ID_1. Further, the incoming link, for example, link ID_M, is referred to as an incoming directed link from a node whose timestamp is older to a newer node as seen from the older node, that is, node ID_4.

Further, a link attribute 970 for identifying a link attribute is registered in the directed link. Like the node attribute 960, any parameters can be included in the link attribute 970 depending on the purpose of analysis. As an exemplary purpose, in the embodiment shown in FIG. 9, the link ID, the link source content ID, the link destination content ID, the link source access timestamp for indicating when the access to the link source was performed, etc., are registered.

Note that, in this embodiment, content is cumulatively created in chronological order and the directed link is created as a link towards a content that is affected by the link source content, met certain conditions, and newly created in chronological order. Thus, even if a content created in the past is edited under the influence of another content created later than the content because it is registered in the action log data as a newer content in chronological order, the information propagation graph can be generated as DAG (Directed Acyclic Graph) that has no loop. Therefore, in the embodiment, a directed graph, that is referred to as DAG among groups of directed graphs, is generated and various logical processings corresponding to DAG are guaranteed to be applicable. The details of the link generation processing will be described later.

FIG. 10 is a schematic diagram showing a data structure for defining the information propagation graph 910 on the information processing apparatus. The data structure in FIG. 10 is shown as an example of the configuration including a node list 1000 and a link list 1050. In the node list 1000, characteristics of the generated nodes in the node directed graph and node attributes are registered. The node list 1000 includes a field 1010 for registering node IDs and a field 1020 for registering node attributes. If the analysis server 102 wants to acquire the node information, it refers to the node list 1000 to acquire the node ID and a node attribute 1020, and uses them for user analysis.

Further, node list 1000 includes a field 1030 for registering outgoing links and a field 1040 for registering incoming links. The field 1030 gives a measure indicating whether a specific node has induced the creation of other nodes by other users. For example, it can be determined that node ID_3 affects another node by one link and nodes ID_1 and ID_2 affect other nodes by two links in response to generation of the other nodes, respectively, by counting the number of links registered in the field 1030. Further, it can be said that the incoming link is a measure indicating the node concerned is subject to combined influences from other nodes. For example, if any incoming node of a specific node ID is not generated at all, it can be said that the content is generated for the first time in the content set.

In this embodiment, the link list 1050 is configured as a list separately from the node list 1000. The link list 1050 is configured by including a field 1060 for registering a link ID uniquely identifying the link and a field 1070 for registering a link attribute. If the information propagation graph 910 is registered in a memory from the node list 1000, the analysis server 102 refers to the link ID registered in the node list 1000 to enable the reference of a link destination or link source. Note that the formulation of the information propagation graph 910 shown in FIG. 9 is just an illustrative example and it can be combined into a single list or separated into different lists individually for each field. If possible, it can be registered in a vector format in response to a specific program configuration or hardware conditions.

3-4. Generation of Information Propagation Graph

Figure 11:
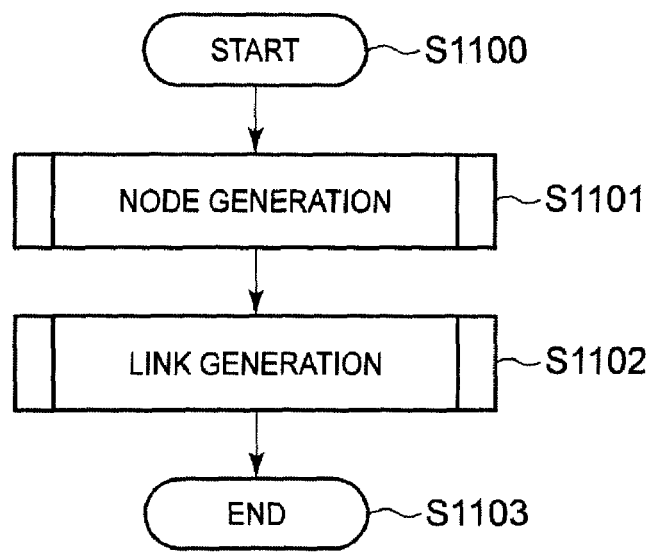
FIG. 11 is a flowchart of the information propagation graph 910 executed by the analysis server 102 and processing for creating each data structure of FIG. 10.

The creation of the information propagation graph is the processing performed by the information propagation graph acquirer 212 of the analysis server 102. FIG. 11 is the flowchart of the analysis server 102 for creating the information propagation graph 910 and each data structure of FIG. 10. The creation processing for the information propagation graph in the embodiment starts at step S1100. Then, in step S1101 as separately defined processing, the node generation processing is performed on the content set to generate the nodes and node attributes. After that, in step S1102 as separately defined processing, processing for generating a link between generated nodes is performed to register the information propagation graph as a directed graph in the analysis server 102. The processing ends at step S1103. The following describes in detail the separately defined processing step S1101 and step S1102.

3-4-1. Node Generation Processing (S1101)

Figure 12:
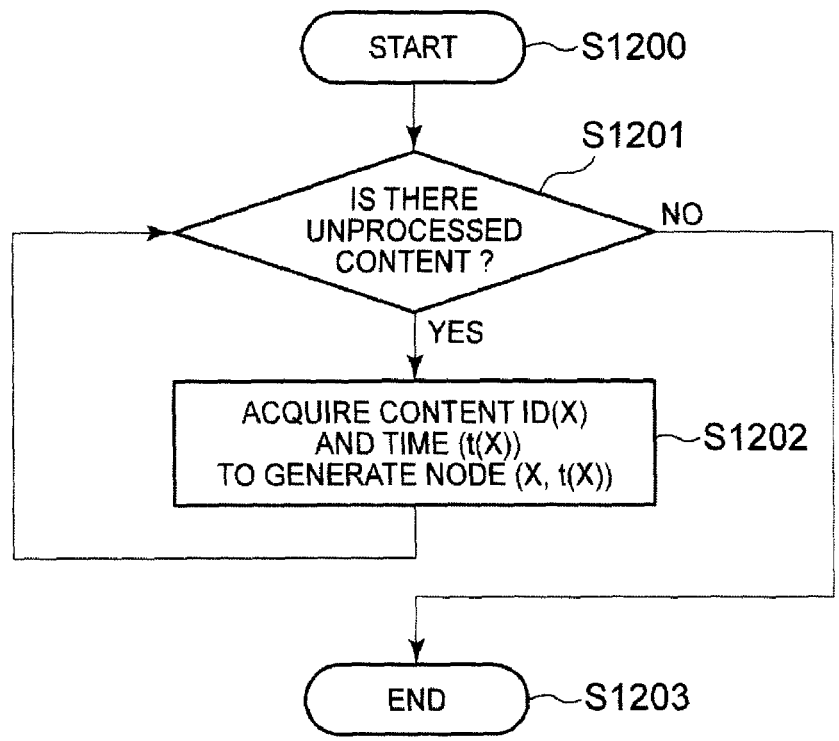
FIG. 12 is a flowchart of an example of node generation processing.

FIG. 12 is a flowchart of node generation processing according to the embodiment. The node generation processing starts at step S1200. Then, in step S1201, the content IDs of the content set 800 are, for example, registered in a queue to determine whether any unprocessed content registered as elements of the content set is still present. If any unprocessed content is not left in step S1201 (No), the processing branches to step S1203 to end the processing. On the other hand, if an unprocessed content is still present in step S1201 (Yes), content ID(X) and time t(X) attached to the content ID(X) are acquired in step S1202 to generate node (X, t(X)). After that, processing branches to step S1201 to determine again whether any unprocessed content is still present or not and this processing is repeated until an unprocessed content does not appear. Note that in the processing step S1202, a node identification value of the node concerned is assigned to register node attributes in each corresponding field of the node list 1000 of FIG. 10.

3-4-2. Link Generation Processing

Figure 13:
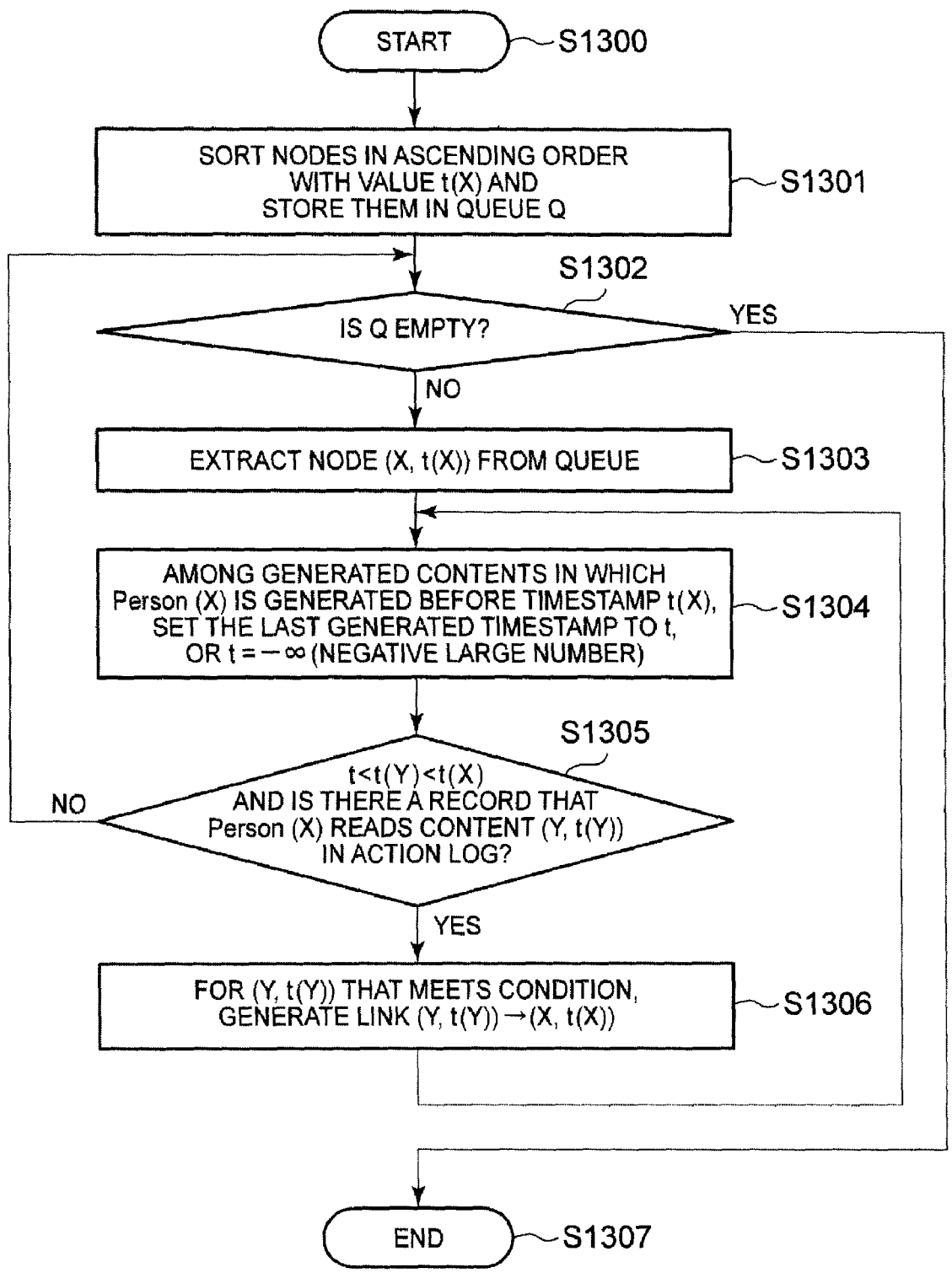
FIG. 13 is a flowchart of an example of link generation processing.

In the link generation processing, processing for defining a link between generated nodes is executed. FIG. 13 shows a flowchart of the embodiment of the link generation processing. The processing in FIG. 13 starts at step S1300. Then, in step S1301, nodes are sorted in ascending order of the t(X) values and the sorted result is registered in queue Q. In step S1302, it is determined whether the link generation processing is completed based on whether Q is empty or not. In another embodiment, the completion of the link generation can also be determined by setting processed flags in due order without using the queue.

If Q is not empty in step S1302 (No), node (X, t(X)) is acquired from the queue in step S1303. Then, in step S1304, user ID registered in the node attribute is referred to set, in Person (X), a user of the user ID who creates the node (X, t(X)). Then, among contents generated by the user having the user ID specified in Person(X) before timestamp t(X), the timestamp of the last generated content is set to t. If there is no timestamp concerned, it is set to t=−∞ (negative large number).

In step S1305, t<t(Y)<t(X) and it is determined whether content Y exists so that the record of the user having the user ID registered as Person(X) has read content Y in the action log data 900. This determination is processing for node (X, t(X)) to identify an affected node by proceeding from the bottom node in the reverse chronological order to enable searching of the directed graph efficiently. Note that, if the data concerned appears within the action log data 900, it means that node (Y, t(Y)) was already registered in the processing of FIG. 12.

If the processing in step S1305 returns a positive result (Yes), each node (Y, t(Y)) that meets the conditions in step S1305 generates a link in step S1306 in such a manner that the node (X, t(X)) is a link destination node and the node (Y, t(Y)) is a link source node. Then, a link ID, for example link ID_K, is assigned to the generated link. Information on the generated link is such that node attributes of the node are described in the node attributes of the node identification value corresponding to the node (Y, t(Y)) in the node list 1000 and a value of link ID_K is described in the outgoing link.

On the other hand, in the incoming link field of the node identification value corresponding to the node (X, t(X)), link ID_K as the link ID of the generated link is entered. Further, in the link list 1050, link ID_K as the link ID of the generated link is entered in the field 1060, and the link source content ID, the link destination content ID, and the link source access timestamp are entered in the field 1070 to generate a link between adjacent nodes.

After that, the processing branches to step S1304 to repeat link generation until a node with a link generated for the node (X, t(X)) does not exist. On the other hand, if the determination in step S1305 returns a negative result (No), the processing branches to step S1302 to repeat the processing from step S1302 to step S1306. In the above-mentioned processing, the information propagation graph 910, the node list 1000 and the link list 1050 are constructed as corresponding data structures for nodes existing within the content set.

In yet another embodiment, it is preferable to add a condition such that a content that meets t(Y)<t(Y')<t(X) and Person (Y)=Person(Y') in the determination step S1305 is not found as a condition to select Y. This is to ensure the generation of a link to be associated with node (X, t(X)) on a layer-by-layer basis. Further, in still another embodiment associated therewith, statistical processing using the value of Δt=|t(X)−t(Y)| can also be introduced as a weighting function to lower the relevance as Δt becomes large and links from multiple contents Y' generated by the same user can also be selected.

The generated information propagation graph is stored in the information propagation graph storage 220 to be used for the processing of calculation of the amount of user characteristic.

3-4-3. Amount of User Characteristic Calculation

Figure 14:
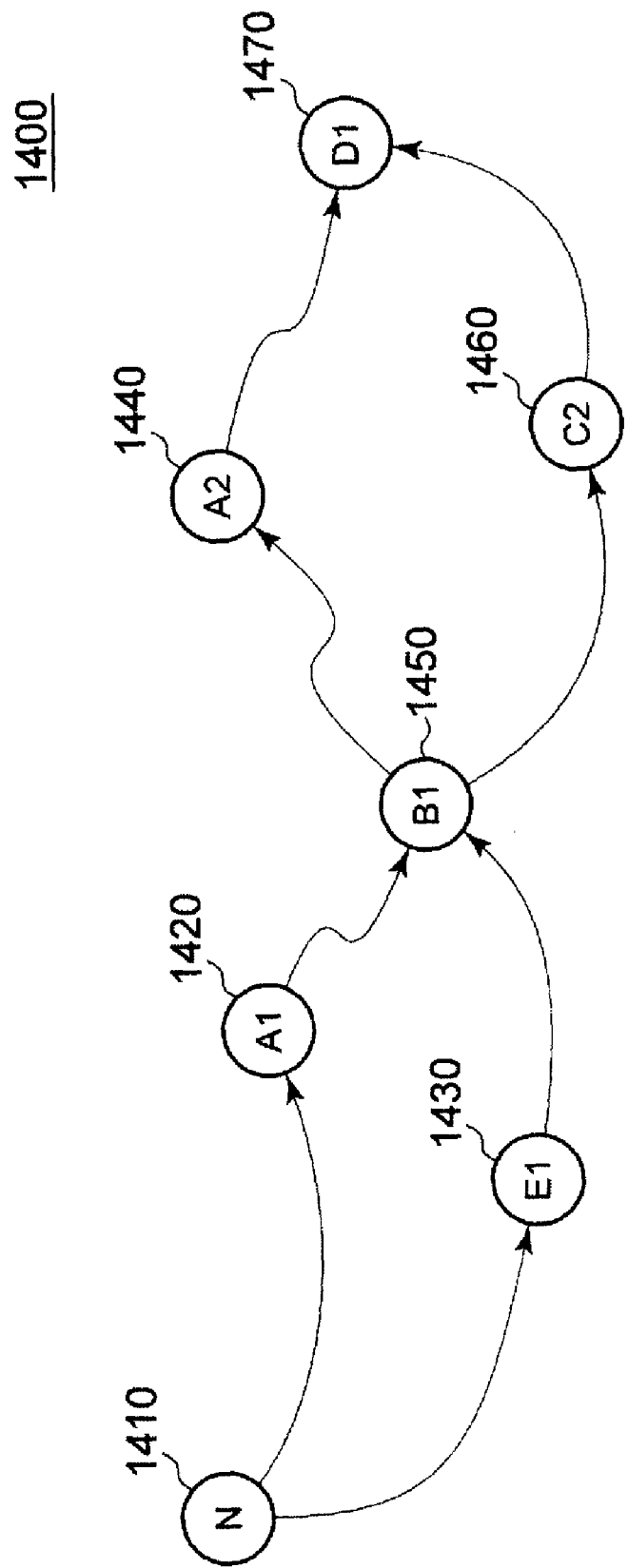
FIG. 14 is a schematic diagram of calculation processing for an amount of user characteristic executed by an analysis server.

The amount of user characteristic calculation is the processing executed by the characteristic user calculator 222 of the analysis server 102. The processing outline is showed referring to FIG. 14. Among nodes 1410 to 1470 shown in FIG. 14, prior to the amount of user characteristic calculation, the processing starts from the node whose timestamp is the latest to accumulatively calculate the amount of node characteristic toward an upstream side. Specifically, after calculating amounts of node characteristic of nodes 1440 and 1460, which are directly linked with the node 1450 from which information is directly propagated, the amount of node characteristic of node 1450 is cumulatively calculated. For example, the amount of node characteristic B1 of the node 1450 can be calculated as B1=(A2+C2). The final amount of calculated user characteristic is generated using contents generated by the user, that is, the sum of the amount of node characteristic calculated for each of the user's nodes. The amount of user characteristic can be set by various setting methods depending on specific applications and purposes.

The amount of node characteristic of a node whose timestamp is the oldest among the nodes generated by the user can be set as the amount of user characteristic. Further, the amount of user characteristic can be set to the value of a node having the largest value among the amounts of node characteristic. Further, as the amount of user characteristic, an average value of the amounts of node characteristic or an average value of amounts of node characteristic of top N (where N is a positive integer) can be employed. The above-mentioned amount of user characteristic can be selected appropriately for a specific purpose, or can be set by using any other scoring or ranking technique.

Figure 15:
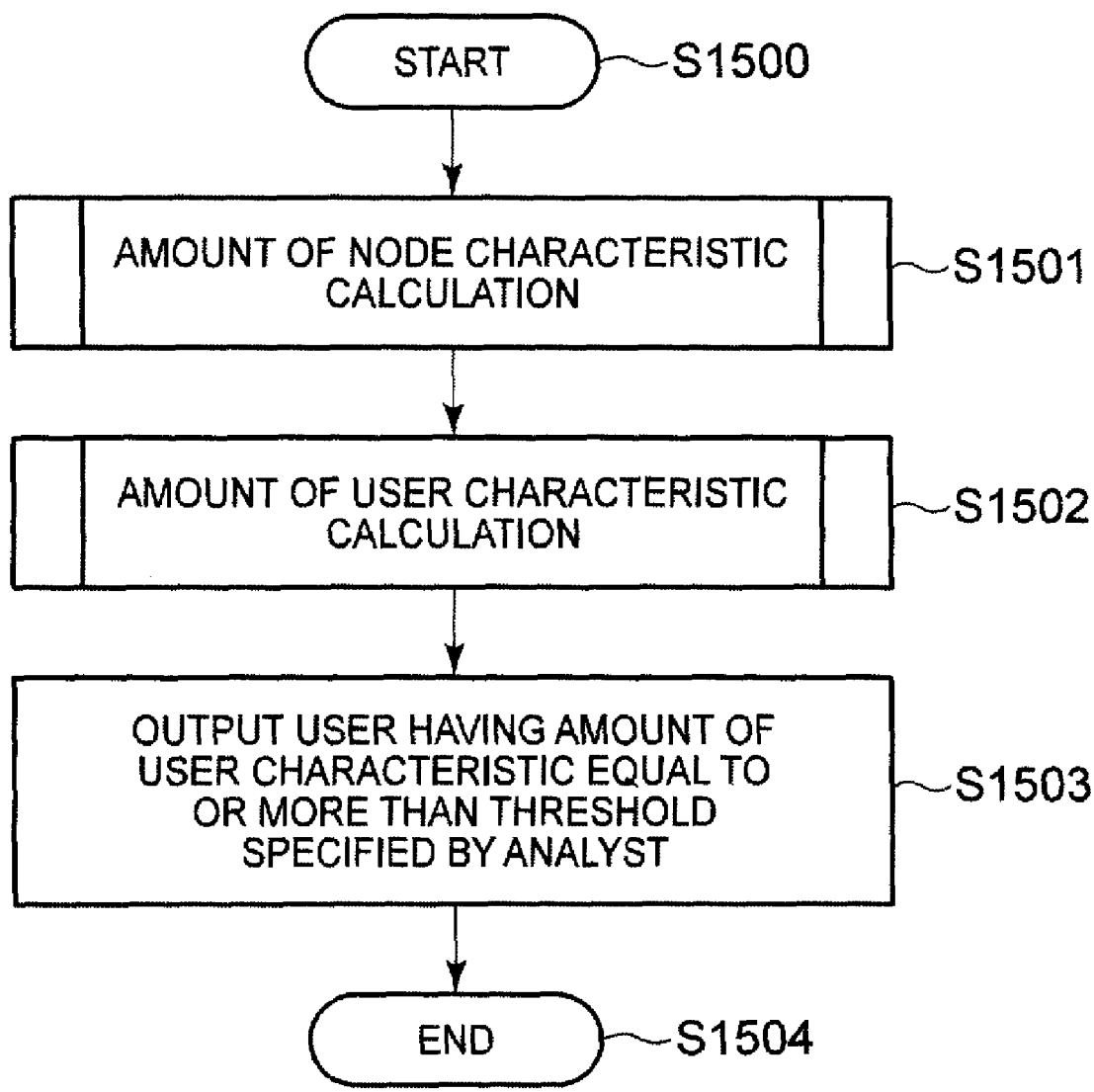
FIG. 15 is a flowchart of an example of the amount of user characteristic calculation processing.

The amount of user characteristic calculation processing will be described by referring to FIG. 15. The amount of user characteristic calculation processing starts at step S1500. Then, in step S1501, the amount of node characteristic, as defined later, is calculated. The amount of user characteristic is calculated in step S1502 from the amount of node characteristic, as defined later and calculated in step S1501. Then, in step S1503, the calculation result is obtained and recorded together with the user ID in the user characterizing storage 224. In the embodiment shown in FIG. 15, among users having large amounts of user characteristic, users having values equal to or more than a threshold value are extracted and output as targets to be registered.

3-4-3-1. Amount of Node Characteristic Calculation Processing

Figure 16:
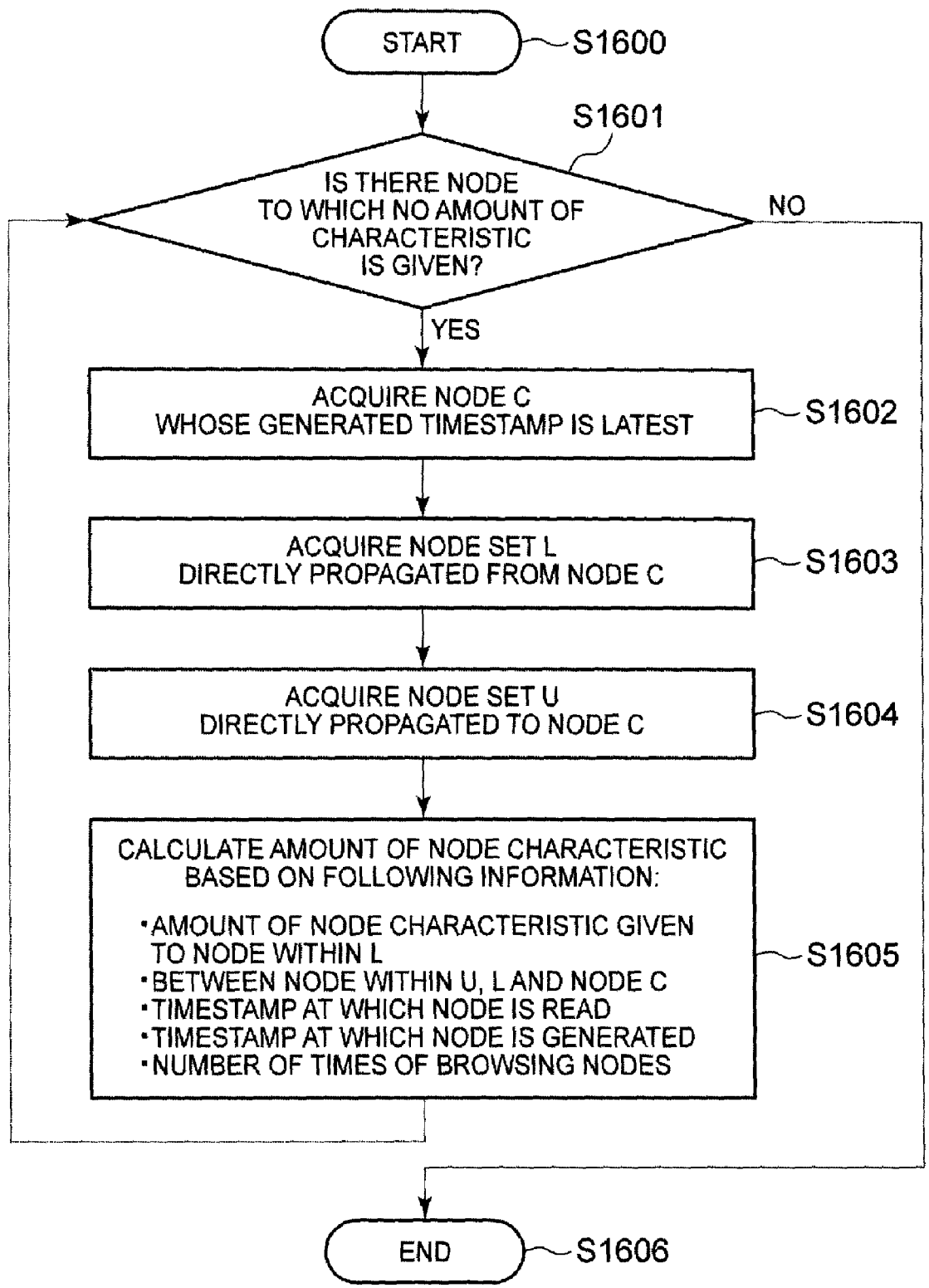
FIG. 16 is a flowchart of an example of processing executed by a node characterizing calculator.

FIG. 16 is a flowchart of the embodiment of processing executed by the node characterizing calculator. The processing of FIG. 16 starts at step S1600. Then, in step S1601, it is tested whether there is a node to which no amount of characteristic is given. If there is no node to which no amount of characteristic is given in step S1601 (No), the processing branches to step S1606 to end the processing. If there is a node whose amount of characteristic should be calculated in step S1601 (Yes), node C whose generated timestamp is the latest is acquired in step S1602.

In step S1603, a node set L to which information is directly propagated from the node C is acquired. After that, in step S1604, a node set U from which information is directly propagated to the node C is acquired. Then, in step S1605, the amount of node characteristic of the node C is calculated. The calculation of the amount of node characteristic can use the amount of node characteristic given to nodes in node set L and time information between nodes within the node sets U or L and the node C, for example, time intervals between the timestamp at which the content is read and the timestamp at which the content is written.

After that, the processing branches to step S1601 repeat the processing until the test in step S1601 returns a negative result. Thus, the above-mentioned processing enables the calculation of amounts of node characteristic for all nodes in the information propagation graph.

3-4-3-2. Conversion of Amount of Node Characteristic into Numerical Value (step S1605)

Figure 17:
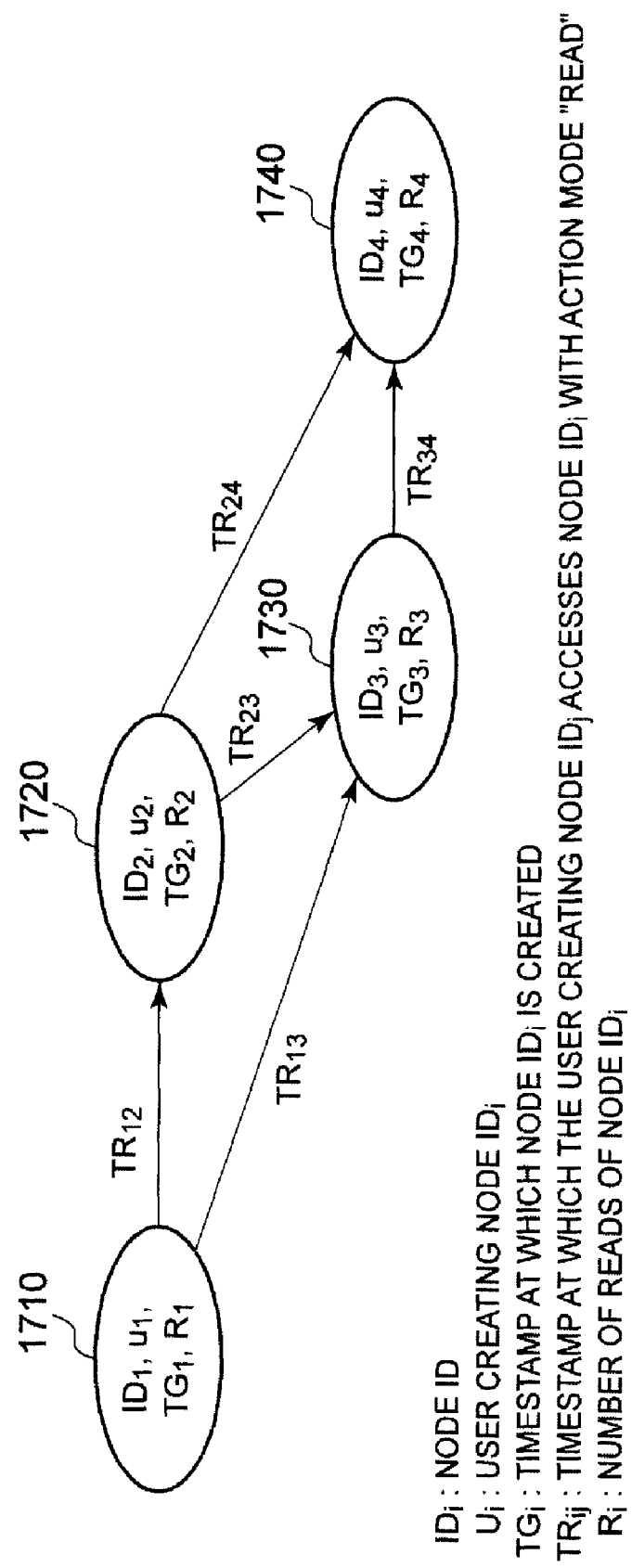
FIG. 17 is an explanatory drawing of variable definition and an information propagation graph used for calculation of the amount of node characteristic.

The calculation of the amount of node characteristic will be described with reference to a variable definition and information propagation graph 1700 shown in FIG. 17. It is assumed here that the information propagation graph 1700 includes four nodes (four contents) in total. Each of the nodes 1710 to 1740 refers to the data structure described with reference to FIG. 10. The following is assumed: $ID_i$ is the node identification value; $U_i$ is the user ID creating the node $ID_i$; $TG_i$ is the timestamp at which the node $ID_i$ was created; $TR_{ij}$ is the timestamp at which a user creating node $ID_j$ read the node $ID_i$ (the timestamp at which the user accessed the node $ID_i$ with an action mode "Read"); and $R_i$ is the number of times the node $ID_i$ was read.

In this embodiment, two specific examples for determining a value characterizing the node are shown. In one specific example, the following values characterizing the node are defined as the amount of node characteristic: the earliness of the node creation, the frequency of the node being browsed, and the level of influence it has to other contents. In the embodiment, the user having nodes with the above-mentioned characteristics is referred to as an early adopter. The calculation of the amount of node characteristic for finding the early adopter is made by assuming the following conditions:

(1) The time interval from the generation of the first content $\Delta T_i = T_i - T_{minG}$ is small (where G means a value in the information propagation graph, and $T_i$ is a timestamp of node ID=i, and $T_{minG}$ is a timestamp of the oldest node within G,); (2) the number of reads is big; and (3) the number of descendants $N_i$ is large.

Note that, among the variables, $N_i$ is the number of nodes located downstream of the information propagation graph G, and for example, it can be calculated and defined by the following equation (1):

[Equation 1]

$N_i$=Number of Nodes Reachable from Node $i$ along a directed link (1)

Based on the above assumptions, the level of the early adopter can be defined by the following equation (2):

[Equation 2]

$$DEA(i) = w_t f(\Delta TG_i) + w_p g(R_i) + w_a h(N_i) \quad (2)$$

In equation (2), $f(\Delta TG_i)$ is a monotone non-increasing function of $\Delta TG_i$, which satisfies $f(\Delta TG_{minG})=1$ and $f(\Delta TG_{maxG}) \approx 0$. Further, $g(R_i)$ and $h(N_i)$ are monotone non-decreasing functions of $R_i$ and $N_i$, respectively, whose minimum value=0 and maximum value=1. Further, $w_t$, $w_p$ and $w_a$ are weights for f, g, and h, respectively.

To be more specific, equation (2) can be described as equation (3):

[Equation 3]

$$DEA(i) = w_t e^{-\Delta TG_i} + w_p \frac{R_i}{R_{max}} + w_a \frac{N_i}{\#V - 1} \quad (3)$$

In equation (3), $R_{max}$ means the number of times the most read node is read, and #V is the number of nodes in the information propagation graph G. The equation is described for the purpose of describing the embodiment, but the present invention is not limited to any specific embodiment.

3-4-4. Quantification of Amount of User Characteristic (step S1502)

Using the numerical evaluation method described above, the resulting amount of node characteristic is used to calculate the amount of user characteristic. The resulting amount of user characteristic is a value for characterizing how the user functions as the early adopter.

Figure 18:
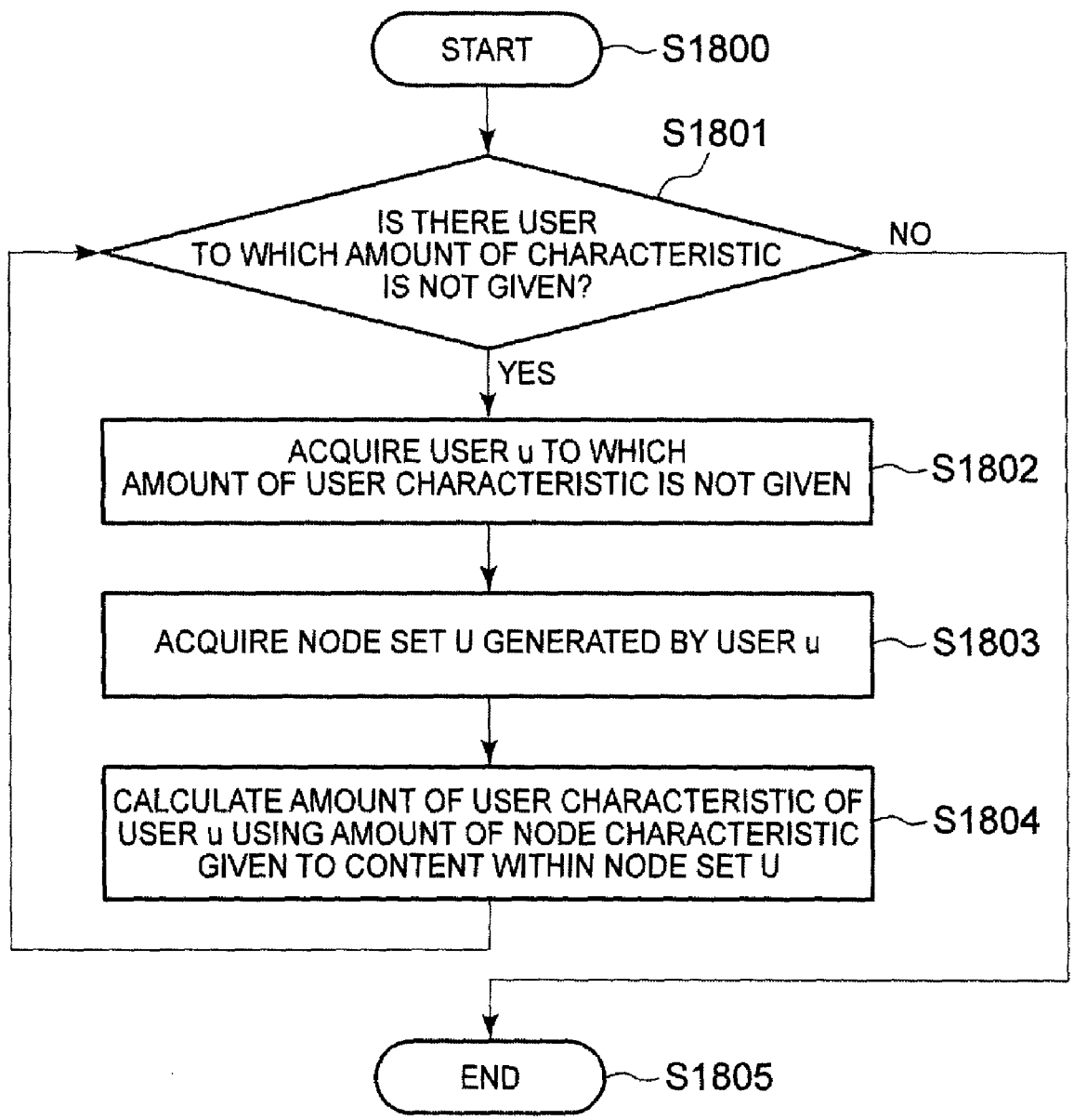
FIG. 18 is a flowchart of an example of calculation processing for obtaining the amount of user characteristic.

FIG. 18 is a flowchart of the embodiment of calculation processing for the amount of user characteristic. The processing in FIG. 18 starts at step S1800. Then, in step S1801, it is determined whether any user to which the amount of characteristic is not given is present or not. If there is no user to which the amount of characteristic is not given in step S1801 (No), the processing branches to step S1805 to end the processing. On the other hand, if there is a user whose amount of characteristic should be calculated in step S1801 (Yes), user u to which the amount of user characteristic is given is acquired in step S1802. Then, in step S1803, a content set U generated by the user u is acquired.

In step S1084, the amount of user characteristic of the user u is calculated using the amount of node characteristic given to the nodes within the node set U. After step S1804, the processing branches to step S1801 repeat the processing until the amount of user characteristic is calculated for all users.

Note that in calculating the amount of user characteristic, the amount of user characteristic can be set as the value of a node having the largest value among the amounts of node characteristic.

Further, the average value of the amounts of node characteristic or an average value of amounts of node characteristic of top N (where N is a positive integer) can also be employed.

The processing for generating the amount of user characteristic using a time lag upon the creation of the node can be used to reflect the complicated behavior within a service like SNS such as the heating-up, going-down and heating-up cycle of a specific topic.

In such a case, in order to give the amount of characteristic of the early adopter exactly from the first peak, a weighted average using $\Delta T_i = T_i - T_{minG}$ is used in the amount of user characteristic given by the following equation (4):

[Equation 4]

$$EA(u) = \frac{\sum_{i \in K} f(\Delta TG_i) DEA_u(i)}{|K|} \quad (4)$$

In the equation (4), K is a set of subscripts corresponding to contents generated by the user u.

Further, in equation (4), EA(u) is a weighted average of the amount of node characteristic DEA(i) by f($\Delta T_i$) given to nodes created by each user, |K| is the number of nodes generated by the user u, f($\Delta T_i$) is a monotone non-increasing function, which meets f($\Delta T_{min}$)=1 and f($\Delta T_{max}$)≈0. To be more specific, in an empirical case where references become small exponentially as the time lag becomes large, equation (4) can be properly restated as the following equation (5):

[Equation 5]

$$EA(u) = \frac{\sum_{i \in K} e^{-\Delta T_i} DEA(i)}{|K|} \quad (5)$$

In the other example, the following conditions that the short difference of times from when the node concerned reads another contents until the node concerned is created, the high number of created contents during browsing other contents, and the high level of influence on other contents are defined as the amount of node characteristic. Thus, a user having a characteristic functioning as an information source is referred to as an information propagation user (influencer) in this example. The amount of characteristic for finding the influencer is obtained by assuming conditions as follows:

(1) A value of time lag $\Delta TR_{ji}=(TR_{ji}-TG_i)$ from when another content is read until the node is created is small; (2) the number of child nodes is larger among the nodes for which the read action is taken, that is, $n_i/R_i$ is large (where $n_i$ is the number of child nodes); and (3) the number of descendants $N_i$ is large.

Based on the above assumptions, the degree of influencer DIF(i) for each node i can be defined by the following equation (6):

[Equation 6]

$$DIF(i) = w_t \sum_j f(\Delta TR_{ji}) + w_p g\left(\frac{n_i}{R_i}\right) + w_a h(N_i) \quad (6)$$

In the above equation (6), each term is defined as follows:
[Equation 7]
In equation (6), $w_t$, $w_p$ and $w_a$ are respective weights, f($\Delta TR_{ji}$) is a monotone non-increasing function of $\Delta TR_{ji}$, which meets f($\Delta TR_{ji_{min}}$)=1, f($\Delta TR_{ji_{max}}$)≈0, j is a parent node, $n_i$ is the number of child nodes of i, and $$g\left(\frac{n_i}{R_i}\right) \geq 0, h(N_i) \geq 0 \quad (7)$$

are monotone non-decreasing functions of $$\frac{n_i}{R_i}, N_i,$$

respectively.

Using the above definitions, the degree of influencer DIF(i) in the preferred embodiment is defined by equation (8):

[Equation 8]

$$DIF(i) = w_t e^{-\Delta TR_{ji}} + w_p \frac{n_i}{R_i} + w_a \frac{N_i}{\#V - 1} \quad (8)$$

Using the formulation of the above-mentioned degree of influencer DIF(i), the degree of influencer IF(u) for a specific user u is given by the following equation (9) as an average value of amounts of node characteristic DIF(i) calculated for nodes created by each user:

[Equation 9]

$$IF(u) = \frac{\sum_{i \in K} DIF_u(i)}{|K|} \quad (9)$$

Note that in equation (9), K is a set of subscripts corresponding to information generated by the user u.

The present invention has been described using the above embodiments. According to the present invention, the purpose and role of the client connected to the network in the propagation of information can be detected and registered. This enables, in the server processing, the reflection of the client activity on the network and the extraction of the users, who play information source roles in the network, associated with a specific content attribute.

Further, according to the present invention, the user associated with the specific content attribute can be identified efficiently based on the creation of the information propagation graph.

Note that each function in the processing sections of the present invention is not limited to the configuration of the above-mentioned embodiment.

Many other functions can be used in the integrated function processors according to the specification of the specific embodiment.

Conversely, a function processor can be divided and mounted into many function processors.

The functions of the embodiment can be implemented by a device with executable programs described in object-oriented programming languages, such as C++, Java™, Java™ Beans, Java™ Applet, Java™ Script, Perl and Ruby. The program can be distributed in the form of a device readable recording medium, such as a hard disk drive, a CD-ROM, an MO, a flexible disk, an EEPROM, and an EPROM, or it can be transmitted in a device readable format through the network.

While the embodiment has been described, the present invention is not limited to the above-mentioned embodiment, and changes can be made within the scope of the invention, such as alternative embodiments, addition, changes and deletion, as those skilled in the art can contemplate. In any aspect of the invention, these changes can be made within the scope of the invention as long as the present invention has effects.

What is claimed is:

1. An analysis system for analyzing an activity of an information source on a network, comprising:
an attribute extraction block for extracting an information characteristic value from information transmitted through the network to generate an index list in which the information characteristic value is registered in association with an information identification value;
an information propagation graph acquisition block for searching action history data in association with the information having an attribute extracted by a setting condition from an action type on the network associated with the information, a user ID uniquely identifying a user, and the action history data recorded in association with the information, and registering the information as a node on the network in response to generating or editing the information to generate a graph connected by a link indicating time-series generation of the node using the action type; and a characteristic user calculation block for calculating an amount of node characteristic as a measure to indicate, in the graph, the activity of the node on the network to integrate the amount of node characteristic based on the link in the graph in order to convert, into a numerical value, the activity as the information source of the user;

wherein the link is a directed link that comprises a link attribute comprising of a link ID, a link source content ID, a link destination content ID, and a link source access timestamp for indicating when the access to the link source was performed; and wherein the node contains a node attribute comprising a content ID, a timestamp, a user ID of the user who generates content, and the number of times the node is being read.

2. The analysis system according to claim 1, further comprising:
a server including an information storage for accumulating the information and an action history storage for collecting the action history data, wherein the information propagation graph acquisition block acquires the information and the action history data accumulated in the server and generates a graph about the information propagated via the server.

3. The analysis system according to claim 2, further comprising:
a communication controlling block, wherein the setting condition is acquired through the communication controller to set the attribute of the information.

4. The analysis system according to claim 3, wherein the server is an SNS server or web server.

5. An information processing system for analyzing an activity of an information source on a network, comprising:
a processor;
an attribute extraction block for extracting an information characteristic value from information transmitted through the network to generate an index list in which the information characteristic value is registered in association with an information identification value;
an information propagation graph acquisition block for searching action history data in association with the information having an attribute extracted by a setting condition for specifying the information attribute from an action type on the network associated with the information, a user ID uniquely identifying a user, and the action history data recorded in association with the information, and registering the information as a node on the network in response to generating or editing the information to generate a graph connected by a link indicating time-series generation of the node using the action type; and
a characteristic user calculation block for calculating an amount of node characteristic as a measure to indicate, in the graph, activity of the node on the network to integrate the amount of node characteristic based on the link in the graph in order to convert, into a numerical value, the activity as the information source of the user;

wherein the link is a directed link that comprises a link attribute comprising of a link ID, a link source content ID, a link destination content ID, and a link source access timestamp for indicating when the access to the link source was performed; and wherein the node contains a node attribute comprising a content ID, a timestamp, a user ID of the user who generates content, and the number of times the node is being read.

6. The information processing system according to claim 5, further comprising:
a server connected to the network including an information storage for accumulating the information and an action history storage for collecting the action history data, wherein the information propagation graph acquisition block acquires the information and the action history data accumulated in the server to generate a graph about the information propagated via the server.

7. The information processing system according to claim 6, further comprising:
a communication controlling block, wherein the setting condition is acquired through the communication controller to set the attribute of the information.

8. The information processing system according to claim 7, wherein the server is an SNS server or web server.

9. The information processing system according to claim 6, wherein the information processing system is a function module of the server.

10. An activity analysis method for allowing a computer to analyze an activity of an information source on a network, the method allowing the computer to execute the steps of:
extracting an information characteristic value from information transmitted through the network to generate an index list in which the information characteristic value is registered in association with an information identification value;
searching action history data in association with the information having an attribute extracted by a setting condition for specifying the information attribute from an action type on the network associated with the information, a user ID uniquely identifying a user, and the action history data registered in association with the information;
registering the information as a node in response to generating or editing the information on the network to generate a graph connected by a link indicating time-series generation of the node using the action type;
calculating an amount of node characteristic as a measure to indicate, in the graph, the activity of the node on the network; and
integrating the amount of node characteristic based on the link in the graph to convert, into a numerical value, the activity as the information source of the user;
wherein the link is a directed link that comprises a link attribute comprising of a link ID, a link source content ID, a link destination content ID, and a link source access timestamp for indicating when the access to the link source was performed; and
wherein the node contains a node attribute comprising a content ID, a timestamp, a user ID of the user who generates content, and the number of times the node is being read.

11. The activity analysis method according to claim 10, wherein the graph generation step includes a step of acquiring the information and the action history data to generate the graph about information propagations via the server and whose attributes are specified by the setting condition.

12. The activity analysis method according to claim 11, wherein the setting conditions are keywords, and the method further comprises a step of acquiring the setting conditions through a communication controller to store, in an information storage, the setting conditions for setting the attributes of the information.

13. The activity analysis method according to claim 12, wherein the step of converting the activities into numerical values and storing them is to convert, into the numerical values, the activities functioning as an information source of the user who accesses an SNS server or web server.

14. An activity analysis program product for allowing a computer to analyze an activity of an information source on a network, the program product stored in a non-transitory computer readable medium which when executed, allows the computer to execute the steps of:

extracting information characteristic values from information transmitted through the network to generate an index list in which the information characteristic values are registered in association with information identification values;

searching action history data in association with the information having attributes extracted by a setting condition for specifying the information attributes from an action type on the network associated with the information, a user ID uniquely identifying a user, and the action history data registered in association with the information;

registering the information as a node in response to generating or editing the information on the network to generate a graph connected by a link indicating time-series generation of the node using the action type;

calculating an amount of node characteristic as such a measure that the node in the graph functions as an information source; and integrating the amount of node characteristic based on the link in the graph to convert, into a numerical value, the activity as the information source of the user;

wherein the link is a directed link that comprises a link attribute comprising of a link ID, a link source content ID, a link destination content ID, and a link source access timestamp for indicating when the access to the link source was performed; and wherein the node contains a node attribute comprising a content ID, a timestamp, a user ID of the user who generates content, and the number of times the node is being read.

15. The activity analysis program product according to claim 14, wherein the graph generation step includes a step of acquiring the information and the action history data to generate the graph about the information propagation via the server whose attributes are specified by the setting conditions.

16. The activity analysis program product according to claim 14, wherein the setting condition are keywords, and the program further comprises a step of acquiring the setting conditions through a communication controller to store, in an information storage, the setting conditions for setting the attributes of the information.

17. The activity analysis program product according to claim 14, wherein the step of converting the activity into a numerical value and storing it is to convert, into the numerical value, the activity functioning as an information source of the user who accesses an SNS server or web server.

* * * * *